(12) United States Patent
Kato

(10) Patent No.: US 11,806,855 B2
(45) Date of Patent: Nov. 7, 2023

(54) ELECTRIC POWER TOOL, AND METHOD FOR CONTROLLING MOTOR OF ELECTRIC POWER TOOL

(71) Applicant: MAKITA CORPORATION, Anjo (JP)

(72) Inventor: Itsuku Kato, Anjo (JP)

(73) Assignee: MAKITA CORPORATION, Anjo (JP)

( * ) Notice: Subject to any disclaimer, the term of this patent is extended or adjusted under 35 U.S.C. 154(b) by 400 days.

(21) Appl. No.: 17/026,932

(22) Filed: Sep. 21, 2020

(65) Prior Publication Data

US 2021/0094163 A1   Apr. 1, 2021

(30) Foreign Application Priority Data

Sep. 27, 2019   (JP) ................... 2019-177315

(51) Int. Cl.
| | |
|---|---|
| B25D 16/00 | (2006.01) |
| B25B 19/00 | (2006.01) |
| H02P 6/06 | (2006.01) |
| B25B 23/147 | (2006.01) |
| B25F 5/00 | (2006.01) |

(52) U.S. Cl.
CPC ............ *B25D 16/006* (2013.01); *B25B 19/00* (2013.01); *B25B 23/1475* (2013.01); *H02P 6/06* (2013.01); *B25D 2216/0023* (2013.01); *B25F 5/001* (2013.01)

(58) Field of Classification Search
CPC .......... B25D 16/006; B25D 2216/0023; B25B 19/00; B25B 23/1475; H02P 6/06; B25F 5/001
See application file for complete search history.

(56) References Cited

U.S. PATENT DOCUMENTS

| | | | |
|---|---|---|---|
| 2,373,664 | A | 4/1945 | Emery |
| 2,373,667 | A | 4/1945 | Emery |
| 2,564,224 | A | 8/1951 | Mitchell |
| 2,825,436 | A | 3/1958 | Amtsberg |
| 2,881,884 | A | 4/1959 | Amtsberg |

(Continued)

FOREIGN PATENT DOCUMENTS

| | | |
|---|---|---|
| CN | 102348536 A | 2/2012 |
| CN | 105983937 A | 10/2016 |

(Continued)

OTHER PUBLICATIONS

Jun. 9, 2022 Office Action issued in U.S. Appl. No. 17/026,390.

(Continued)

*Primary Examiner* — Michelle Lopez
(74) *Attorney, Agent, or Firm* — Oliff PLC

(57) ABSTRACT

An electric power tool in one aspect of the present disclosure includes a motor, an impact mechanism, an impact detector, and a control circuit. The control circuit controls a motor current based on a drive duty ratio in a first driving term. The first driving term corresponds to a time period from when the motor is started until impact is detect. The drive duty ratio corresponds to a sum of a basic duty ratio and a proportional duty ratio. The control circuit controls the motor current so that an actual rotational speed of the motor is consistent with a target rotational speed after elapse of the first driving term.

16 Claims, 12 Drawing Sheets

(56) References Cited

U.S. PATENT DOCUMENTS

| | | |
|---|---|---|
| 2,973,071 A | 2/1961 | Sturrock |
| 3,068,973 A | 12/1962 | Maurer |
| 3,070,201 A | 12/1962 | Spyridakis |
| 3,156,334 A | 11/1964 | Hoza |
| 3,250,153 A | 5/1966 | Purkey |
| 3,352,368 A | 11/1967 | Maffey, Jr. |
| 3,362,486 A | 1/1968 | Majouanine |
| 3,369,615 A | 2/1968 | Maffey, Jr. |
| 3,606,931 A | 9/1971 | Karden |
| 3,648,784 A | 3/1972 | Schoeps |
| 3,804,180 A | 4/1974 | Gelfand et al. |
| 4,002,212 A | 1/1977 | Schoeps |
| 4,276,675 A | 7/1981 | Pioch |
| 4,314,782 A | 2/1982 | Beekenkamp |
| 4,505,170 A | 3/1985 | Van Laere |
| 4,619,162 A | 10/1986 | Van Laere |
| 4,719,976 A | 1/1988 | Bleicher et al. |
| 4,905,423 A | 3/1990 | van Laere |
| 4,977,966 A | 12/1990 | Farber et al. |
| 5,049,012 A | 9/1991 | Cavedo |
| 5,092,410 A | 3/1992 | Wallace et al. |
| D343,345 S | 1/1994 | Ogawa et al. |
| 5,836,403 A | 11/1998 | Putney et al. |
| 5,888,031 A | 3/1999 | Buck et al. |
| 6,104,114 A | 8/2000 | Takeda et al. |
| 6,138,772 A | 10/2000 | Miescher et al. |
| 6,158,526 A | 12/2000 | Ghode et al. |
| 6,546,815 B2 | 4/2003 | Yamada et al. |
| 6,553,627 B1 | 4/2003 | Horler |
| 6,786,683 B2 | 9/2004 | Schaer et al. |
| 7,032,685 B2 | 4/2006 | Nakamizo |
| 7,259,486 B2 | 8/2007 | Yamamoto |
| D590,681 S | 4/2009 | Palermo et al. |
| D591,130 S | 4/2009 | Palermo et al. |
| D606,377 S | 12/2009 | Ho |
| 7,673,702 B2 | 3/2010 | Johnson et al. |
| 7,823,256 B2 | 11/2010 | Engelfried et al. |
| 7,905,377 B2 | 3/2011 | Krondorfer et al. |
| 7,918,286 B2 | 4/2011 | Nagasaka et al. |
| 7,934,566 B2 | 5/2011 | Hlinka et al. |
| 8,032,990 B2 | 10/2011 | Shinma et al. |
| 8,069,929 B2 | 12/2011 | Sugimoto et al. |
| 8,127,974 B2 | 3/2012 | Zhang et al. |
| 8,371,394 B2 | 2/2013 | Grand |
| 8,371,708 B2 | 2/2013 | Nagasaka et al. |
| 8,407,860 B2 | 4/2013 | Brennenstuhl et al. |
| 8,460,153 B2 | 6/2013 | Rudolph et al. |
| 8,584,770 B2 | 11/2013 | Zhang et al. |
| 8,827,003 B2 | 9/2014 | Nagasaka et al. |
| 8,925,645 B2 | 1/2015 | Harada et al. |
| 8,925,646 B2 | 1/2015 | Seith et al. |
| 8,961,358 B2 | 2/2015 | Hirabayashi |
| 9,114,521 B2 | 8/2015 | Yoshikawa |
| 9,308,638 B2 | 4/2016 | Kondo et al. |
| 9,321,159 B2 | 4/2016 | May |
| 9,393,711 B2 | 7/2016 | Myrhum, Jr. et al. |
| 9,415,497 B2 | 8/2016 | Hecht et al. |
| 9,463,566 B2 | 10/2016 | Yoshikane et al. |
| 9,566,692 B2 | 2/2017 | Seith et al. |
| 9,643,300 B2 | 5/2017 | Kumagai et al. |
| 9,849,577 B2 | 12/2017 | Wyler et al. |
| D835,959 S | 12/2018 | Eardley |
| 10,295,990 B2 | 5/2019 | Dey, IV et al. |
| D853,815 S | 7/2019 | Yaschur et al. |
| 10,654,153 B2 | 5/2020 | Murakami et al. |
| 2001/0004939 A1 | 6/2001 | Durmeyer et al. |
| 2002/0035876 A1 | 3/2002 | Donaldson |
| 2005/0109519 A1 | 5/2005 | Kawai et al. |
| 2005/0121209 A1 | 6/2005 | Shimizu et al. |
| 2005/0263305 A1 | 12/2005 | Shimizu et al. |
| 2006/0090913 A1 | 5/2006 | Furuta |
| 2006/0185869 A1 | 8/2006 | Arimura |
| 2007/0000676 A1 | 1/2007 | Arimura |
| 2007/0209162 A1 | 9/2007 | McRoberts et al. |
| 2007/0267206 A1 | 11/2007 | Chen |
| 2008/0078067 A1 | 4/2008 | Nicolantonio et al. |
| 2008/0099217 A1 | 5/2008 | Seith et al. |
| 2009/0000434 A1 | 1/2009 | Shinma et al. |
| 2009/0133894 A1 | 5/2009 | Mizuhara |
| 2009/0178520 A1 | 7/2009 | Engelfried et al. |
| 2010/0005629 A1 | 1/2010 | Di Nicolantonio |
| 2010/0064482 A1 | 3/2010 | Martin |
| 2010/0096155 A1 | 4/2010 | Iwata et al. |
| 2010/0307782 A1 | 12/2010 | Iwata et al. |
| 2011/0011609 A1 | 1/2011 | Simm et al. |
| 2011/0073334 A1 | 3/2011 | Iimura et al. |
| 2011/0079407 A1 | 4/2011 | Iimura et al. |
| 2011/0120741 A1 | 5/2011 | Limberg et al. |
| 2011/0188232 A1 | 8/2011 | Friedman et al. |
| 2011/0284255 A1 | 11/2011 | Ookubo et al. |
| 2011/0315417 A1 | 12/2011 | Matsunaga et al. |
| 2012/0073846 A1 | 3/2012 | Hirai et al. |
| 2012/0132452 A1 | 5/2012 | Hoop et al. |
| 2012/0199372 A1 | 8/2012 | Nishikawa et al. |
| 2012/0234566 A1 | 9/2012 | Mashiko et al. |
| 2012/0279736 A1 | 11/2012 | Tanimoto et al. |
| 2012/0292065 A1 | 11/2012 | Hoshi et al. |
| 2012/0292070 A1 | 11/2012 | Ito et al. |
| 2012/0318549 A1 | 12/2012 | Nagasaka et al. |
| 2012/0318550 A1 | 12/2012 | Tanimoto et al. |
| 2012/0319508 A1 | 12/2012 | Oomori |
| 2013/0000934 A1 | 1/2013 | Tadokoro et al. |
| 2013/0008679 A1 | 1/2013 | Nishikawa et al. |
| 2013/0014967 A1 | 1/2013 | Ito et al. |
| 2013/0025892 A1 | 1/2013 | Mashiko et al. |
| 2013/0062086 A1 | 3/2013 | Ito et al. |
| 2013/0062088 A1 | 3/2013 | Mashiko et al. |
| 2013/0075121 A1 | 3/2013 | Nakamura et al. |
| 2013/0087355 A1 | 4/2013 | Oomori et al. |
| 2013/0126202 A1 | 5/2013 | Oomori et al. |
| 2013/0133911 A1 | 5/2013 | Ishikawa et al. |
| 2013/0139614 A1 | 6/2013 | Johnson et al. |
| 2013/0186661 A1 | 7/2013 | Okubo et al. |
| 2013/0233584 A1 | 9/2013 | Mashiko |
| 2013/0270932 A1 | 10/2013 | Hatfield et al. |
| 2013/0270934 A1 | 10/2013 | Smith et al. |
| 2013/0327552 A1* | 12/2013 | Lovelass ............... B25F 5/02 173/176 |
| 2013/0333910 A1 | 12/2013 | Tanimoto et al. |
| 2014/0069672 A1 | 3/2014 | Mashiko et al. |
| 2014/0124229 A1 | 5/2014 | Takahashi et al. |
| 2014/0131059 A1 | 5/2014 | Verbrugge et al. |
| 2014/0144658 A1 | 5/2014 | Schmid et al. |
| 2014/0145524 A1 | 5/2014 | Tanimoto et al. |
| 2014/0158388 A1 | 6/2014 | Johnson |
| 2014/0158390 A1 | 6/2014 | Mashiko et al. |
| 2014/0182869 A1 | 7/2014 | Kumagai et al. |
| 2014/0224075 A1 | 8/2014 | Merrick |
| 2014/0251649 A1 | 9/2014 | Kondo |
| 2014/0318821 A1 | 10/2014 | Wyler et al. |
| 2014/0371018 A1 | 12/2014 | Ito |
| 2014/0374130 A1 | 12/2014 | Nakamura et al. |
| 2015/0000946 A1 | 1/2015 | Amend et al. |
| 2015/0022125 A1 | 1/2015 | Takano et al. |
| 2015/0041169 A1 | 2/2015 | Kumagai et al. |
| 2015/0047866 A1 | 2/2015 | Sakai et al. |
| 2015/0075829 A1 | 3/2015 | Seith et al. |
| 2015/0083448 A1 | 3/2015 | Chen et al. |
| 2015/0083451 A1 | 3/2015 | Nishikawa |
| 2015/0122522 A1 | 5/2015 | Fujimoto et al. |
| 2015/0144365 A1 | 5/2015 | Hirabayashi et al. |
| 2015/0158160 A1 | 6/2015 | Kato |
| 2015/0174753 A1 | 6/2015 | Kamiya |
| 2015/0209952 A1 | 7/2015 | Nishii et al. |
| 2015/0231770 A1 | 8/2015 | Kusakawa et al. |
| 2015/0231771 A1 | 8/2015 | Sakai et al. |
| 2015/0266176 A1 | 9/2015 | Takeuchi et al. |
| 2015/0298308 A1 | 10/2015 | Kato |
| 2015/0303842 A1 | 10/2015 | Takano et al. |
| 2015/0333664 A1 | 11/2015 | Bantle |
| 2015/0336249 A1 | 11/2015 | Iwata et al. |
| 2015/0343617 A1 | 12/2015 | Kondo et al. |
| 2015/0352699 A1 | 12/2015 | Sakai et al. |
| 2015/0372633 A1 | 12/2015 | Machida et al. |

(56) References Cited

U.S. PATENT DOCUMENTS

| | | | |
|---|---|---|---|
| 2016/0008961 A1 | 1/2016 | Takano et al. |
| 2016/0075004 A1 | 3/2016 | Tsubakimoto et al. |
| 2016/0079887 A1 | 3/2016 | Takano et al. |
| 2016/0107297 A1 | 4/2016 | Ishikawa et al. |
| 2016/0129568 A1 | 5/2016 | Nishikawa et al. |
| 2016/0190965 A1 | 6/2016 | Miyazaki |
| 2016/0250743 A1 | 9/2016 | Kikuchi et al. |
| 2016/0311102 A1 | 10/2016 | Ebner |
| 2016/0325415 A1 | 11/2016 | Huber et al. |
| 2016/0342151 A1 | 11/2016 | Dey, IV et al. |
| 2016/0354905 A1 | 12/2016 | Ely et al. |
| 2017/0008156 A1 | 1/2017 | Miyazaki et al. |
| 2017/0021478 A1 | 1/2017 | Junkers et al. |
| 2017/0028537 A1 | 2/2017 | McClung et al. |
| 2017/0036327 A1 | 2/2017 | Murakami et al. |
| 2017/0057064 A1 | 3/2017 | Ishikawa et al. |
| 2017/0106517 A1 | 4/2017 | Machida |
| 2017/0106525 A1 | 4/2017 | Brauer et al. |
| 2017/0144278 A1 | 5/2017 | Nishikawa et al. |
| 2017/0144289 A1 | 5/2017 | Yamashita |
| 2017/0144290 A1 | 5/2017 | Tsutsui et al. |
| 2017/0151657 A1 | 6/2017 | Nagasaka et al. |
| 2017/0173768 A1 | 6/2017 | Dey, IV et al. |
| 2017/0190027 A1 | 7/2017 | Koizumi et al. |
| 2017/0190028 A1 | 7/2017 | Howard et al. |
| 2017/0190032 A1 | 7/2017 | Leong et al. |
| 2017/0239801 A1 | 8/2017 | Kondo et al. |
| 2017/0246732 A1 | 8/2017 | Dey, IV et al. |
| 2017/0326712 A1 | 11/2017 | Li et al. |
| 2017/0326720 A1 | 11/2017 | Kuroyanagi et al. |
| 2017/0348835 A1 | 12/2017 | Skelly et al. |
| 2017/0361449 A1 | 12/2017 | Goble |
| 2018/0001444 A1 | 1/2018 | Matsushita et al. |
| 2018/0099394 A1 | 4/2018 | Ichikawa et al. |
| 2018/0117745 A1 | 5/2018 | Murakami et al. |
| 2018/0152120 A1 | 5/2018 | Yabuguchi |
| 2018/0200872 A1 | 7/2018 | Leong |
| 2018/0222022 A1 | 8/2018 | Kumagai et al. |
| 2018/0297179 A1 | 10/2018 | Osada et al. |
| 2019/0030692 A1 | 1/2019 | Harada et al. |
| 2019/0030696 A1 | 1/2019 | Seith et al. |
| 2019/0047132 A1 | 2/2019 | Kumagai et al. |
| 2019/0111550 A1* | 4/2019 | Kato .................. B25F 5/00 |
| 2019/0111551 A1* | 4/2019 | Kato .................. H02P 29/0016 |
| 2019/0255687 A1 | 8/2019 | Schneider et al. |
| 2020/0009709 A1 | 1/2020 | Kumagai et al. |
| 2020/0122281 A1 | 4/2020 | Wierer et al. |
| 2020/0198100 A1 | 6/2020 | Schneider et al. |
| 2020/0262037 A1 | 8/2020 | Schneider et al. |
| 2021/0094158 A1 | 4/2021 | Kato et al. |
| 2021/0100170 A1 | 4/2021 | Suzuki |
| 2021/0162571 A1 | 6/2021 | Kondo |
| 2021/0237249 A1 | 8/2021 | Fischer et al. |
| 2021/0260733 A1 | 8/2021 | Fischer et al. |
| 2021/0260734 A1 | 8/2021 | Kubale et al. |

FOREIGN PATENT DOCUMENTS

| | | | | |
|---|---|---|---|---|
| CN | 109382779 A | 2/2019 | | |
| JP | 2004-187379 A | 7/2004 | | |
| JP | 2013-111729 A | 6/2013 | | |
| JP | 2015-150671 A | 8/2015 | | |
| JP | 2018-176373 A | 11/2018 | | |
| JP | 2019-030947 A | 2/2019 | | |
| WO | 2013012098 A1 | 1/2013 | | |
| WO | WO-2014098256 A1 * | 6/2014 | ........... A01B 63/145 |

OTHER PUBLICATIONS

Mar. 28, 2023 Notice of Reason(s) for Refusal issued in Japanese Patent Application No. 2019-177315.

Dec. 12, 2022 Office Action issued in U.S. Appl. No. 17/026,390.

Apr. 12, 2023 Office Action issued in Chinese Patent Application No. 202011021340.4.

* cited by examiner

| TRIGGER PULLING AMOUNT (LEVEL) | TARGET ROTATIONAL SPEED / BASIC DUTY RATIO ||||||||||||||||
| | SOFT MODE |||| MEDIUM MODE |||| HARD MODE |||| MAX MODE ||||
| | BEFORE IMPACT || AFTER IMPACT || BEFORE IMPACT || AFTER IMPACT || BEFORE IMPACT || AFTER IMPACT || BEFORE IMPACT || AFTER IMPACT ||
| | Ta1 | BD1 | Ta2 | BD2 | Ta1 | BD1 | Ta2 | BD2 | Ta1 | BD1 | Ta2 | BD2 | Ta1 | BD1 | Ta2 | BD2 |
|---|---|---|---|---|---|---|---|---|---|---|---|---|---|---|---|---|
| 0 | 0 | 0% | 0 | 0% | 0 | 0% | 0 | 0% | 0 | 0% | 0 | 0% | 0 | 0% | 0 | 0% |
| 1 | 100 | 4% | 100 | 4% | 100 | 4% | 100 | 4% | 100 | 4% | 100 | 4% | 100 | 4% | 100 | 4% |
| 2 | 150 | 5% | 150 | 5% | 200 | 7% | 200 | 7% | 230 | 7.5% | 230 | 7.5% | 250 | 8% | 250 | 8% |
| 3 | 200 | 7% | 200 | 7% | 300 | 9% | 250 | 8% | 400 | 10% | 290 | 8.7% | 450 | 11% | 320 | 9.3% |
| 4 | 250 | 8% | 230 | 7.5% | 450 | 11% | 320 | 9.3% | 750 | 19% | 470 | 11.5% | 800 | 20% | 500 | 12% |
| 5 | 300 | 9% | 250 | 8% | 600 | 15% | 400 | 10% | 1100 | 27% | 700 | 17% | 1200 | 30% | 750 | 18% |
| 6 | 400 | 10% | 290 | 9% | 800 | 20% | 500 | 12% | 1400 | 35% | 950 | 24% | 1600 | 40% | 1050 | 26% |
| 7 | 500 | 12% | 350 | 9.5% | 1100 | 27% | 700 | 18% | 1800 | 45% | 1150 | 28.5% | 2100 | 52% | 1400 | 35% |
| 8 | 600 | 15% | 400 | 10% | 1400 | 35% | 950 | 24% | 2200 | 55% | 1500 | 37% | 2600 | 65% | 1700 | 43% |
| 9 | 800 | 20% | 500 | 12% | 1700 | 43% | 1100 | 27% | 2700 | 67% | 1750 | 43.5% | 3100 | 77% | 1900 | 47% |
| 10 | 1100 | 27% | 700 | 18% | 2100 | 52% | 1400 | 35% | 3200 | 80% | 2000 | 50% | 3700 | 92% | 2300 | 58% |

Ta1 : FIRST TARGET ROTATIONAL SPEED  
Ta2 : SECOND TARGET ROTATIONAL SPEED  
BD1 : FIRST BASIC DUTY RATIO  
BD2 : SECOND BASIC DUTY RATIO

FIG. 5

ELECTRIC POWER TOOL, AND METHOD FOR CONTROLLING MOTOR OF ELECTRIC POWER TOOL

CROSS-REFERENCE TO RELATED APPLICATIONS

This application claims the benefit of Japanese Patent Application No. 2019-177315 filed on Sep. 27, 2019 with the Japan Patent Office, the entire disclosure of which is incorporated herein by reference.

BACKGROUND

The present disclosure relates to an electric power tool.

Japanese Unexamined Patent Application Publication No. 2018-176373 discloses a rotary impact tool. The rotary impact tool includes an impact mechanism. The impact mechanism includes a hammer and an anvil. The hammer rotates when receiving a rotational force of a motor. The anvil rotates when receiving a rotational force of the hammer. The anvil is attached to a tool bit. When the anvil receives a torque equal to or greater than a specified magnitude, the hammer impacts the anvil. The rotary impact tool configured as such can tighten the screw firmly to an object by impact on the anvil.

SUMMARY

In the rotary impact tool, when a rotational speed of the motor during the impact is too high, the hammer that has climbed over a hammering arm of the anvil may hit the anvil before fully displaced to the front of the rotary impact tool. In this case, an impact force applied to the anvil may be reduced. When the hammer hits the anvil before fully displaced to the front of the rotary impact tool, the hammer may strike a corner of the anvil. When the hammer hits the corner of the anvil, the anvil may be scraped with the hammer, resulting in that durability of the anvil may be reduced. In the rotary impact tool, it is desirable that the hammer reliably hits a root of the anvil.

Therefore, in the rotary impact tool, it is desirable that an excessive increase in the rotational speed is inhibited. Impacting at a rotational speed that is not too high and is suitable for the impact mechanism can apply a strong impact force to the anvil.

On the other hand, when the rotational speed is reduced due to a load applied to the motor, the impact force is reduced, resulting in that tightening is delayed. Therefore, it is desirable that the motor is controlled to maintain a constant rotational speed (hereinafter, "constant rotation control"). However, if the constant rotation control is performed before the impacting, the motor rotates at a low speed before the impacting. This may increase work time in a work before the impacting and/or a work with a light load which does not require the impact, and thus reduce work efficiency.

Also, depending on a use state (for example, operated state of a trigger or an operation mode selected) of the rotary impact tool, usability thereof may be impaired due to a difference between the rotational speed when the impacting is started and the rotational speed in the constant rotation control during the impacting.

In one aspect of the present disclosure, it is preferable that usability of an electric power tool can be improved.

An electric power tool in one aspect of the present disclosure includes a motor, an impact mechanism, an impact detector, and/or a control circuit.

The impact mechanism includes a hammer and an anvil. The hammer is configured to be rotated by the motor. The anvil is configured to rotate in response to receiving a rotational force of the hammer. The anvil is configured to be attached to a tool bit (tool element). When the anvil receives a first torque, the hammer impacts (or strikes or hammers or blows) the anvil in a rotation direction of the hammer. The first torque is equal to or greater than a preset magnitude. The first torque, for example, may have a value equal to or greater than a specified value.

The impact detector is configured to detect impact (or striking or hammering or blowing) on the anvil.

The control circuit is configured to control a motor current based on a pulse-width modulation signal. The motor current corresponds to an electric current supplied to the motor. In other words, the control circuit controls the motor.

The control circuit is configured to execute a first motor control in a first driving term. The first driving term corresponds to a time period from when the motor is started by the control circuit until the impact is detected by the impact detector. The first motor control includes controlling the motor current in accordance with the pulse-width modulation signal based on a drive duty ratio. The drive duty ratio corresponds to a sum of a basic duty ratio and a proportional duty ratio. The basic duty ratio is set in accordance with a first target rotational speed of the motor. The proportional duty ratio is proportional to a speed error. The speed error corresponds to a difference between the first target rotational speed and an actual speed of the motor.

The control circuit is configured to execute a second motor control after elapse of the first driving term. The second motor control includes controlling the motor current so that the actual rotational speed is consistent with a second target rotational speed of the motor. The control circuit may control the motor current so that the actual rotational speed is maintained constant (at the second target rotational speed, for example) in the second motor control.

In the electric power tool configured as above, the motor is controlled based on the drive duty ratio in the first driving term. This can inhibit reduction of the actual rotational speed before the impact is detected. Further, the speed error when the impact is detected can be reduced. Therefore, fluctuation in the actual rotational speed before and after the impact is detected can be reduced, and usability of the electric power tool can be improved.

The electric power tool may further includes a manual operation receiver configured to receive a manual operation by a user of the electric power tool. The control circuit may set the first target rotational speed in accordance with the manual operation received by the manual operation receiver.

The electric power tool may further include a first memory. The first memory may store a first rotational speed and a second rotational speed. The control circuit may set the first rotational speed to the first target rotational speed when the manual operation received by the manual operation receiver reaches a first level. The control circuit may set the second rotational speed to the first target rotational speed when the manual operation received by the manual operation receiver reaches a second level.

The first memory may store three or more rotational speeds. The three or more rotational speeds may be associated with respective levels of the manual operation.

The control circuit may set the basic duty ratio so that the basic duty ratio increases in response to the first target rotational speed increasing.

The control circuit may set the second target rotational speed in accordance with the manual operation received by the manual operation receiver.

The electric power tool may further include a second memory. The second memory may store a third rotational speed and a fourth rotational speed. The control circuit may set the third rotational speed to the second target rotational speed when the manual operation received by the manual operation receiver reaches the first level. The control circuit may set the fourth rotational speed to the second target rotational speed when the manual operation received by the manual operation receiver reaches the second level.

The second memory may store three or more rotational speeds. The three or more rotational speeds may be associated with respective levels of the manual operation.

The second motor control may include a proportional-integral control.

The control circuit may execute a proportional duty ratio varying process. The proportional duty ratio varying process may include varying the proportional duty ratio in accordance with a difference between the first target rotational speed and the second target rotational speed (hereinafter, "target error"). In the electric power tool configured as such, a difference between the second target rotational speed and the actual rotational speed after the impact is detected can be reduced in accordance with the target error.

The proportional duty ratio varying process may include varying the proportional duty ratio so that the proportional duty ratio increases in response to the target error decreasing. In the electric power tool as above, reduction in the actual rotational speed in the first driving term can be inhibited as the target error is smaller. This can reduce a difference between the second target rotational speed and the actual rotational speed when the impact is detected.

The control circuit may execute the proportional duty ratio varying process when the first target rotational speed is greater than the second target rotational speed.

The control circuit may selectively execute either the first motor control or a constant rotation control. In this case, the control circuit does not execute the first motor control and the constant rotation control simultaneously (or in parallel). The constant rotation control may include controlling the motor current so that the actual rotational speed is maintained to be constant. More specifically, the constant rotation control, for example, may include controlling the motor current so that the rotational speed is maintained to be a constant speed corresponding to the manual operation (specifically, for example, corresponding to a level or an amount of the manual operation). In other words, the motor current may be controlled so that the actual rotational speed is maintained to be a constant rotational speed corresponding to the manual operation while the manual operation is maintained (for example, while the level or the amount of the manual operation is maintained). The control circuit may execute the constant rotation control in the first driving term when the first target rotational speed is consistent with the second target rotational speed (i.e., the target error is zero (0)). The control circuit may execute the first motor control in the first driving term when the first target rotational speed is not consistent with the second target rotational speed.

In the electric power tool configured as above, the motor current is controlled so that, when the target error is zero (0), the actual rotational speed is maintained to be constant both before and after the impact is detected. In other words, control methods of the motor current are not switched before and after the impact is detected. Thus, usability of the electric power tool can be improved.

The control circuit may control the motor current so that the rotational speed is varied in accordance with the level of the manual operation received by the manual operation receiver. The control circuit may execute the constant rotation control in the first driving term when the level of the manual operation is equal to or smaller than a threshold. The control circuit may execute the first motor control in the first driving term when the level of the manual operation is greater than the threshold. The threshold determines (or indicates) which of the first motor control and the constant rotation control the control circuit executes in the first driving term.

In the electric power tool configured as above, when the level of the manual operation is equal to or smaller than the threshold, the motor current is controlled so that the actual rotational speed is maintained to be constant both before and after the impact is detected. In other words, the control methods are not switched before and after the impact is detected. Thus, usability of the electric power tool can be improved.

Each of the constant rotation control and the second motor control may include a proportional-integral control. The control circuit may execute the proportional-integral control in the constant rotation control based on a first proportional gain. The control circuit may execute the proportional-integral control in the second motor control based on a second proportional gain. The second proportional gain may be different from the first proportional gain. In the electric power tool configured as above, the constant rotation control suitable for the respective situations can be executed before and after the impact is detected.

The first proportional gain may be greater than the second proportional gain. In the electric power tool configured as above, it is easy to maintain the actual rotational speed to be constant before the impact is detected. Further, after the impact is detected, fluctuation of the motor current can be reduced.

Examples of the electric power tool of the present disclosure may include, for example, a rotary impact tool.

A method for controlling a motor of an electric power tool in another aspect of the present disclosure includes:

controlling a motor current based on a drive duty ratio in a first driving term, the first driving term corresponding to a time period from when the motor is started until impact on an anvil of the electric power tool is detected, the motor current being supplied to the motor to drive the motor, the drive duty ratio corresponding to a sum of a basic duty ratio and a proportional duty ratio, the basic duty ratio being set in accordance with a first target rotational speed of the motor, the proportional duty ratio being proportional to a speed error, the speed error corresponding to a difference between the first target rotational speed and an actual rotational speed of the motor; and controlling the motor current so that the rotational speed is consistent with a second target rotational speed of the rotational speed after elapse of the first driving term.

The method as above can exhibit the same effect as the above-described electric power tool.

BRIEF DESCRIPTION OF THE DRAWINGS

Example embodiments of the present disclosure will be described hereinafter with reference to the accompanying drawings, in which:

FIG. 5 is a diagram showing a configuration of a setting table;

DETAILED DESCRIPTION OF EXEMPLARY EMBODIMENTS

First Embodiment

An impact driver 1 (hereinafter, "driver 1") of the present embodiment shown in FIG. 1 may be used, for example, to tighten a bolt, a nut, etc. to an object The driver 1 is a kind of rotary impact tool.

Figure 1:
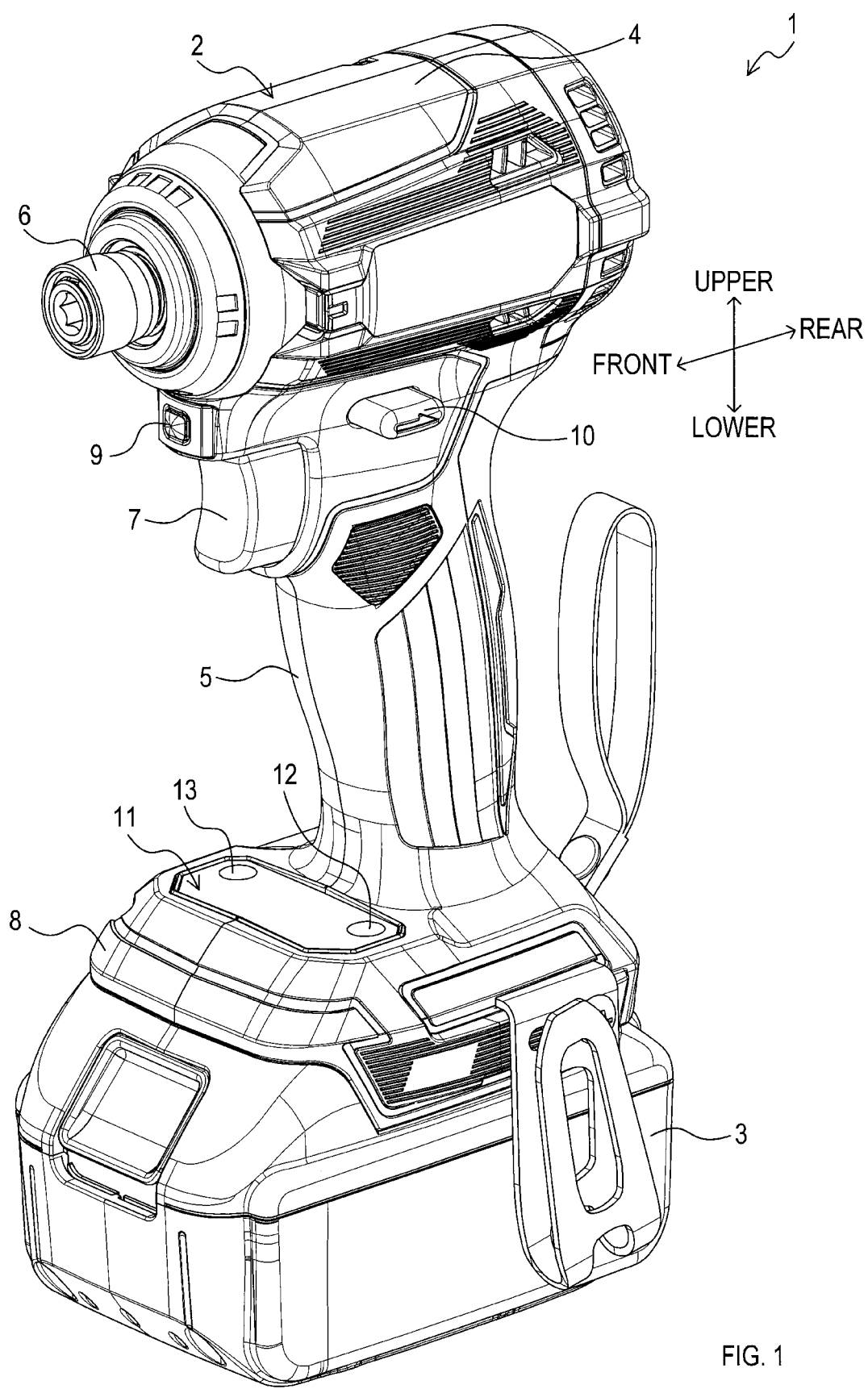
FIG. 1 is a perspective view of an impact driver.

As shown in FIG. 1, the driver 1 includes a tool main body 2 and a battery pack 3. The battery pack 3 may be detachably attached to the tool main body 2. The battery pack 3 supplies electric power to the tool main body 2.

The tool main body 2 includes a housing 4, a handgrip 5, a chuck sleeve 6, a trigger 7, a battery port 8, a mode-changing switch 9, a forward/reverse selector switch 10, and an operation panel 11.

The handgrip 5 is located in a lower area of the housing 4. The handgrip 5 is formed so that a user of the driver 1 can grip the handgrip 5 with one hand.

The chuck sleeve 6 is located in front of the housing 4. The chuck sleeve 6 is provided with an attachment mechanism at a front end portion thereof. The attachment mechanism is configured so that various tool bits (tool elements) are detachably attached to the attachment mechanism. Various tool bits may include, for example, a driver bit and a socket bit.

The trigger 7 is located on an upper front portion of the handgrip 5. The trigger 7 is configured to be operated by the user. The trigger 7 of the present embodiment is displaced, for example, by receiving a manual operation by the user. The manual operation on the trigger 7 can drive the driver 1. The trigger 7 is formed so that the user gripping the handgrip 5 can pull (or squeeze) the trigger 7 with the user's finger.

The battery port 8 is located at a lower end of the handgrip 5. The battery port 8 is configured so that the battery pack 3 is detachably attached to the battery port 8.

The mode-changing switch 9 is located above the trigger 7 in the handgrip 5. The mode-changing switch 9 is configured to be operated by the user. When the mode-changing switch 9 is operated once, an operation mode of the driver 1 is switched to one of pre-registered modes.

The forward/reverse selector switch 10 is located behind the mode-changing switch 9 in the handgrip 5. The forward/reverse selector switch 10 is configured to be operated by the user. When the forward/reverse selector switch 10 is operated, a rotation direction of the chuck sleeve 6 is switched to either a forward direction or a reverse direction. The forward direction (for example, clockwise direction) enables tightening of a screw. The reverse direction (for example, counterclockwise direction) enables loosening a tightened screw.

The operation panel 11 is located in the battery port 8. The operation panel 11 includes an impact button 12 and a special button 13. The impact button 12 and the special button 13 are configured to be operated (for example, depressed) by the user. When the impact button 12 or the special button 13 are operated, the operation mode of the driver 1 is set to one of the pre-registered modes.

Figure 2:
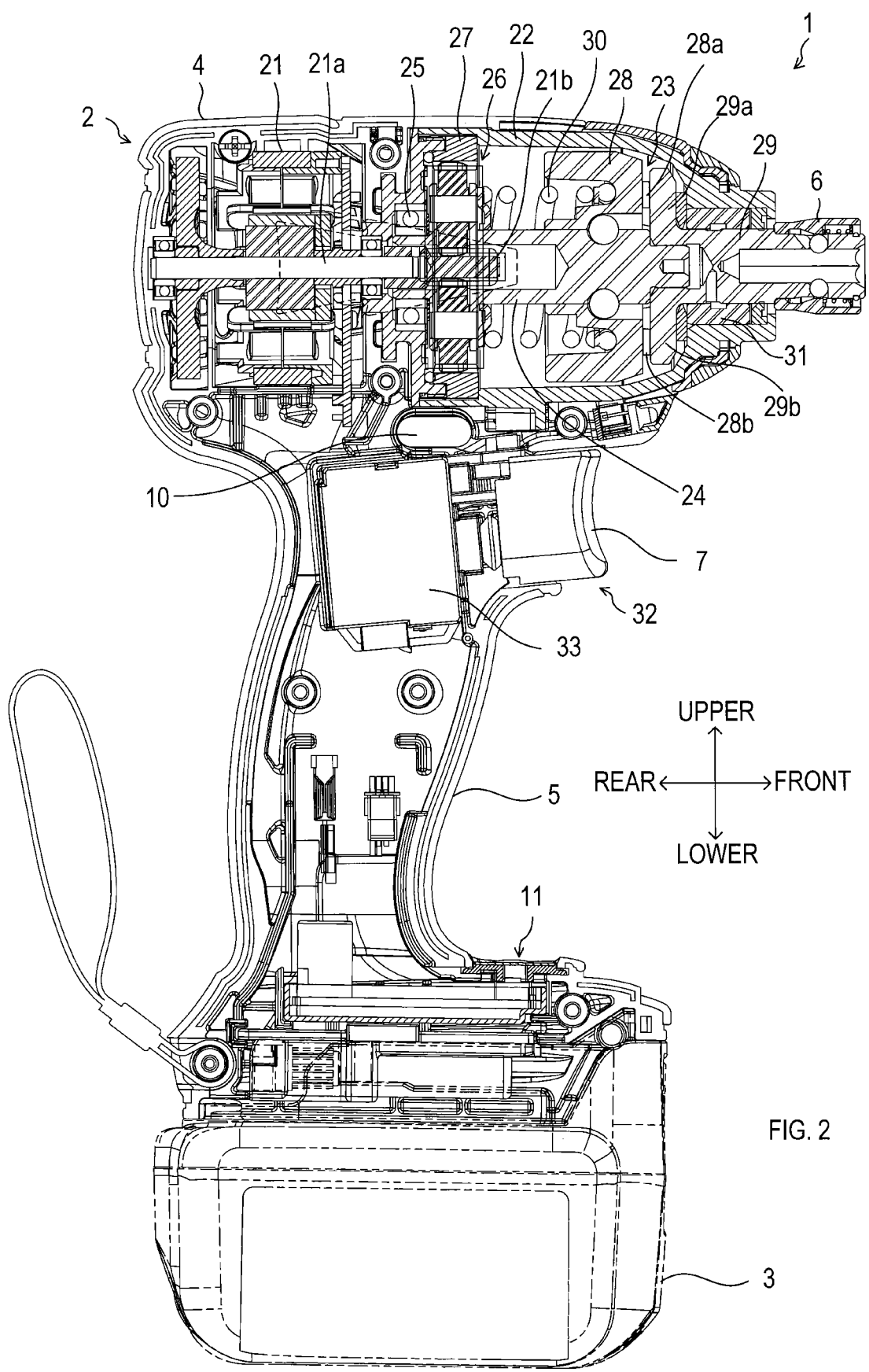
FIG. 2 is a sectional view showing a configuration of the impact driver.

As shown in FIG. 2, the driver 1 includes the motor 21, a hammer case 22, and the impact mechanism 23. The hammer case 22 has a bell-like shape. The housing 4 accommodates the motor 21, the hammer case 22, and the impact mechanism 23.

The hammer case 22 is assembled in front of the motor 21 (that is, right side of the motor 21 in FIG. 2).

The impact mechanism 23 is housed in the hammer case 22. The hammer case 22 coaxially houses a spindle 24. The spindle 24 has a hollow portion on a rear end side thereof. A ball bearing 25 is provided in the hammer case 22 on a rear end side thereof. The ball bearing 25 rotatably supports an outer periphery of the rear end side of the spindle 24.

A planetary gear mechanism 26 is provided in front of the ball bearing 25. The planetary gear mechanism 26 includes two planetary gears. The two planetary gears are rotatably supported so as to be symmetrical about a rotation axis of the planetary gear mechanism 26. The planetary gear mechanism 26 is configured to mesh with an internal gear 27. The internal gear 27 is formed on an inner peripheral surface of a rear end side of the hammer case 22.

The planetary gear mechanism 26 is further configured to mesh with a pinion 21b. The pinion 21b is formed at a leading end of an output shaft 21a of the motor 21.

The impact mechanism 23 includes a hammer 28, an anvil 29, and a coil spring 30, in addition to the spindle 24.

The hammer 28 is coupled to the spindle 24. The hammer 28 is integrally rotatable with the spindle 24, and further movable along the rotation shaft of the spindle 24. The hammer 28 is biased forward by the coil spring 30.

A front end portion of the spindle 24 is loosely and coaxially inserted in a rear end of the anvil 29. In other words, the front end portion of the spindle 24 is rotatably supported by the anvil 29.

The anvil 29 is configured to rotate about an axis thereof by receiving a rotational force and/or a impact force of the hammer 28. A bearing 31 is provided at a front end of the housing 4. The anvil 29 is supported, so as to be rotatable about the axis thereof and axially non-displaceable, by the bearing 31. The chuck sleeve 6 is attached to the front end of the anvil 29.

The output shaft 21a of the motor 21, the spindle 24, the hammer 28, the anvil 29, and the chuck sleeve 6 are all arranged so as to be coaxial with each other.

The hammer 28 includes, for example, a first hammering protrusion 28a and a second hammering protrusion 28b. The first and second hammering protrusions 28a and 28b are configured to apply the rotational force and/or the impact force to the anvil 29. The first and second hammering protrusions 28a and 28b are arranged, for example, at 180° intervals with each other in a circumferential direction of the hammer 28. The first and second hammering protrusions 28a and 28b are arranged to protrude from a front end surface of the hammer 28.

A first hammering arm 29a and a second hammering arm 29b, for example, are provided on the rear end of the anvil 29. The first and second hammering arms 29a and 29b are arranged, for example, a 180° intervals with each other in the circumferential direction of the hammer 28.

When the hammer 28 is biased forward by a biasing force of the coil spring 30, the first and second hammering protrusions 28a and 28b can respectively contact the first and second hammering arms 29a and 29b. Surfaces of the first and second hammering protrusions 28a and 28b which the first and second hammering arms 29a and 29b respectively contact may be, for example, perpendicular to a rotation direction of the hammer 28. Surfaces of the first and second hammering arms 29a and 29b which the first and second hammering protrusions 28a and 28b contact may be, for example, perpendicular to a rotation direction of the anvil 29.

When the spindle 24 rotates by a rotational force of the motor 21 via the planetary gear mechanism 26 in a state where the first and second hammering protrusions 28a and 28b respectively contact the first and second hammering arms 29a and 29b, the hammer 28 rotates together with the spindle 24. The rotational force of the hammer 28 is transmitted to the anvil 29 via the first hammering protrusion 28a, the second hammering protrusion 28b, the first hammering arm 29a, and the second hammering arm 29b.

This consequently causes a tool bit attached to a tip of the anvil 29 to rotate, and enables screw tightening.

When a screw is tightened to a specified depth, the anvil 29 may receive a first torque. The first torque is equal to or greater than a preset magnitude. In other words, the first torque has a value equal to or greater than a specified value (preset value). The first torque is applied to the anvil 29 in a direction opposite the rotation direction of the anvil 29. When the first torque is applied to the anvil 29, a second torque applied to the hammer 28 from the anvil 29 can also have a value equal to or greater than the specified value.

When the second torque has a value equal to or greater than the specified value, the hammer 28 is displaced rearward against the biasing force of the coil spring 30. When the hammer 28 is displaced rearward, the first and second hammering protrusions 28a and 28b respectively climb over the first and second hammering arms 29a and 29b in contact. In other words, the first and second hammering protrusions 28a and 28b temporarily disengage from the first and second hammering arms 29a and 29b. As a result, the hammer 28 idles.

The idling hammer 28 is displaced forward again due to the biasing force of the coil spring 30. As a result, the first and second hammering protrusion 28a and 28b respectively strike (impact) the first and second hammering arm 29a and 29b in the rotation direction.

Accordingly, every time the anvil 29 receives the first torque, the anvil 29 is struck (impacted) repeatedly by the hammer 28. Such intermittent application of the impact force of the hammer 28 to the anvil 29 enables a screw tightening at a high torque.

The trigger switch 32 includes the trigger 7 and a switch body 33.

Figure 3:
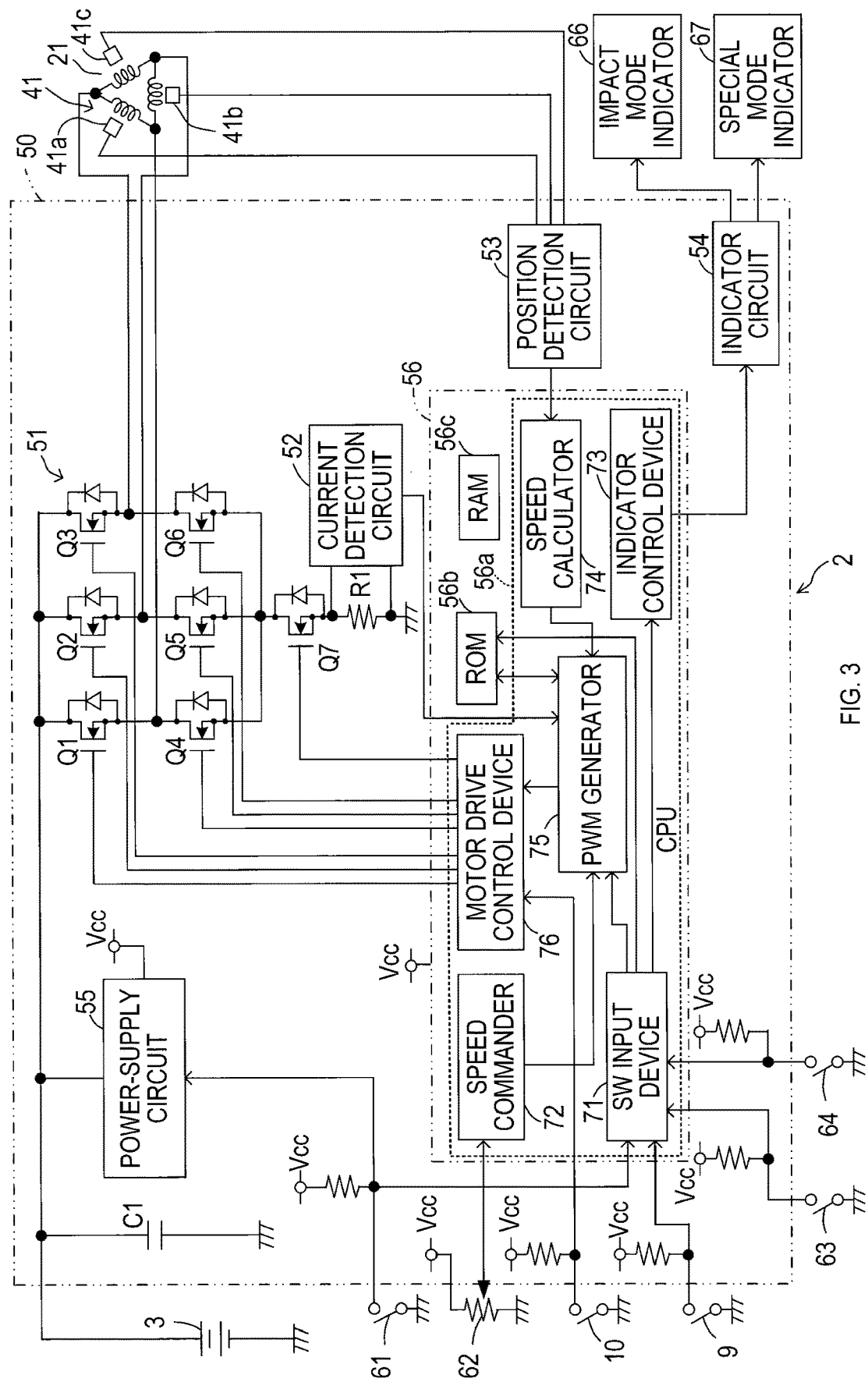
FIG. 3 is a block diagram showing an electrical configuration of a motor drive.

As shown in FIG. 3, the motor 21 is, for example, a three-phase brushless motor. The motor 21 may include three armature windings. The three armature windings may include a U-phase winding, a V-phase winding, and a W-phase winding. The tool main body 2 includes a rotation sensor 41. The rotation sensor 41 is provided to detect a rotational position (that is, rotation angle) of the motor 21. The rotation sensor 41 includes, for example, a first to third Hall sensors 41a to 41c. The respective first to third Hall sensors 41a to 41c are associated with the U-phase winding, the V-phase winding, and the W-phase winding. Each of the first to third Hall sensors 41a to 41c may include, for example, an integrated circuit (IC). The IC may include a Hall element. Each of the first to third Hall sensor 41a to 41c is configured to generate a rotation detection signal corresponding to the rotational position of the motor 21.

The tool main body 2 includes a motor drive 50 shown in FIG. 3. The motor drive 50 controls driving of the motor 21.

The switch body 33 includes a main switch 61 and an operated amount sensor (or displaced amount detector) 62 shown in FIG. 3. The main switch 61 is turned on when the trigger 7 is operated (i.e., when the trigger 7 is displaced). The operated amount sensor 62 is configured to detect a pulled amount (or displaced amount or operated amount) of the trigger 7. The operated amount sensor 62 may include a variable resistor. The variable resistor has a variable resistance value that may vary in accordance with the pulling amount of the trigger 7 (hereinafter, "trigger pulling amount"). The main switch 61 and the manual operation amount sensor 62 are coupled to the motor drive 50.

The tool main body 2 includes a impact switch 63 and a special switch 64 shown in FIG. 3. The impact switch 63 may be turned on when the impact button 12 is depressed. The special switch 64 may be turned on when the special button 13 is depressed. The impact switch 63 and the special switch 64 are coupled to the motor drive 50.

The mode-changing switch 9 and the forward/reverse selector switch 10 are coupled to the motor drive 50.

The motor drive 50 includes drive circuit 51, a current detection circuit 52, a position detection circuit 53, an indicator circuit 54, a power-supply circuit 55, and a control circuit 56.

The drive circuit 51 is configured to receive an electric power from the battery pack 3, and deliver electric current to the U-phase winding, the V-phase winding, and the W-phase winding. In the present embodiment, the drive circuit 51 includes a three-phase full-bridge circuit. The three-phase full-bridge circuit includes a first to sixth switching elements Q1 to Q6. In the present embodiment, each of the first to sixth switching elements Q1 to Q6 is, for example, a metal oxide semiconductor field-effect transistor (MOSFET) but not limited to MOSFET.

In the drive circuit 51, the first to third switching elements Q1 to Q3 are so-called high-side switches. Specifically, the first switching element Q1 is coupled to, for example, a U-phase terminal of the motor 21 and a power-supply line. The power-supply line couples with a positive electrode of the battery pack 3. The second switching element Q2 is coupled to, for example, a V-phase terminal of the motor 21 and the power-supply line. The third switching element Q3 is coupled to, for example, a W-phase terminal of the motor 21 and the power-supply line.

The fourth to sixth switching elements Q4 to Q6 are so called low-side switches. Specifically, the fourth switching element Q4 is coupled to, for example, the U-phase terminal of the motor 21 and a ground line. The ground line couples with a negative electrode of the battery pack 3. The fifth switching element Q5 is coupled to, for example, the V-phase terminal of the motor 21 and the ground line. The sixth switching element Q6 is coupled to, for example, the W-phase terminal of the motor 21 and the ground line.

The motor drive 50 includes a capacitor C1. The capacitor C1 is coupled to the power-supply line. The capacitor C1 is provided in order to reduce voltage fluctuation in the power-supply line.

The ground line is coupled to a ground path having a seventh switching element Q7 and a resistor R1 thereon. The seventh switching element Q7 completes or interrupts the ground path. The current detection circuit 52 is configured to detect a voltage across the resistor R1 as a current detection signal, and output the current detection signal to the control circuit 56. The current detection signal indicates a value of electric current flowing through the resistor R1.

The position detection circuit 53 is configured to detect the rotational position of the motor 21 based on the rotation detection signal from the rotation sensor 41, and output the rotational position detected by the position detection circuit 53 to the control circuit 56 as a position detection signal.

The indicator circuit 54 is configured to turn on or off each of a later-described first to fifth LEDs 81 to 85 shown in FIG. 4, in accordance with a command from the control circuit 56.

The power-supply circuit 55 is configured to supply electric power to internal electric/electronic components of the motor drive 50. The power-supply circuit 55 is configured to receive electric power from the battery pack 3, and generate a power-supply voltage Vcc from the received electric power. The power-supply voltage Vcc is supplied to the control circuit 56, the indicator circuit 54, pull-up resistors, etc. The pull-up resistors are each coupled, for example, as shown in FIG. 3, to the mode-changing switch 9, the main switch 61, the forward/reverse selector switch 10, the impact switch 63, and the special switch 64.

The power-supply circuit 55 is activated when the main switch 61 is turned on. The activated power-supply circuit 55 stops operation thereof when the main switch 61, the mode-changing switch 9, the impact button 12, and the special button 13 are not operated for a given term.

The control circuit 56 includes a microcomputer containing a CPU 56a, a ROM 56b, a RAM 56c. Various functions of the control circuit 56 are implemented by the CPU 56a executing programs stored in a non-transitory tangible storage medium. In the present embodiment, the ROM 56b corresponds to the non-transitory tangible storage medium. When a program stored in the ROM 56 is executed, a method corresponding to the program is executed. A part or all of the functions executed by the CPU 56a may be implemented by hardware. The hardware may include one or more of ICs. The control circuit 56 may include two or more microcomputers. The ROM 56b may be a rewritable non-volatile memory. The ROM 56b stores control characteristics of the motor 21. The control characteristics of the motor 21 may be associated with the respective pre-registered modes.

The control circuit 56 includes function blocks, a SW input device 71, a speed commander 72, an indicator control device 73, a speed calculator 74, a pulse-width modulation (PWM) generator 75, and a motor drive control device 76. Each of the function blocks corresponds to a function implemented by a software process executed by the CPU 56a.

The SW input device 71 is configured to detect ON and OFF of each of the main switch 61, the mode-changing switch 9, the impact switch 63, and the special switch 64. The SW input device 71 is configured to set the operation mode and LED states based on a detection result. The LED states indicate ON or OFF of each of the first to fifth LEDs 81 to 85. The SW input device 71 is configured to store in the ROM 56b information indicating the operation mode set by the SW input device 71. The SW input device 71 is configured to output to the indicator control device 73 LED state information indicating the LED states set by the SW input device 71.

The speed commander 72 is configured to detect the operated amount of the trigger 7 based on an input signal from the operated amount sensor 62, and output a speed command to instruct a rotational speed corresponding to the detected operated amount to the PWM generator 75.

The indicator control device 73 is configured to control the first to fifth LEDs 81 to 85 via the indicator circuit 54 in accordance with the input from the SW input device 71.

The speed calculator 74 is configured to calculate a motor speed based on the position detection signal from the position detection circuit 53. The motor speed corresponds to an actual rotational speed (or rotational frequency) of the motor 21. The speed calculator 74 is configured to output the calculated motor speed to the PWM generator 75.

The PWM generator 75 is configured to read from the ROM 56b the control characteristics corresponding to the operation mode set by the SW input device 71, and generate PWM signals in accordance with the read control characteristics. The PWM signals are control signals for driving the motor 21. In other words, the PWM signals are pulse width modulated signals in accordance with a value of electric current supplied to the motor 21.

In other words, the PWM generator 75 generates the PWM signals based on the read control characteristics and the inputted speed command and motor speed. More specifically, the PWM generator 75 calculates a drive duty ratio (first drive duty ratio DD1 or second drive duty ratio DD2) as later described. The PWM generator 75 generates the PWM signals based on the calculated drive duty ratio (for example, PWM signals having the drive duty ratio).

The motor drive control device 76 is configured to perform PWM driving of the drive circuit 51 in accordance with the PWM signals. The PWM driving means turning on or off the respective first to sixth switching elements Q1 to Q6 in accordance with the PWM signals. The PWM driving of the drive circuit 51 causes electric current to flow to the U-phase winding, the V-phase winding, and the W-phase winding, and rotates the motor 1. That is, the motor drive control device 76 executes a PWM control for energizing the motor 21.

The motor drive control device 76 is configured to switch a rotation direction of the motor 21 based on an input signal from the forward/reverse selector switch 10.

Hereinafter, the operation mode of the driver 1 will be described.

The driver 1, for example, includes ten types of the mode, that is, four impact modes and six special modes. The four impact modes include Max mode, Hard mode, Medium mode, and Soft mode. The six special modes include Wood mode, First Tex mode, Second Tex mode, First Bolt mode, Second Bolt mode, and Third Bolt mode. Tex is a registered trademark. The operation mode of the driver 1 can be set to one of the ten types of the mode.

Each of the ten types of the mode specifies a control method of the motor 21. In order to implement the control method defined for each mode, the control characteristics corresponding to each of the modes are preliminarily stored in the ROM 56b. The control method corresponding to each mode is implemented based on the corresponding control characteristics.

The user can set the operation mode to one of the four impact modes by operation of the impact button 12. The operation mode may be changed in an order of, for example, Max mode, Hard mode, Medium mode, Soft mode, and Max mode through operation of the impact button 12.

The user can set the operation mode to one of the six special modes by operation of the special button 13. The operation mode may be changed in an order of, for example, Wood mode, First Tex mode, Second Tex mode, First Bolt mode, Second Bolt mode, Third Bolt mode, and Wood mode through operation of the special button 13.

Figure 4:
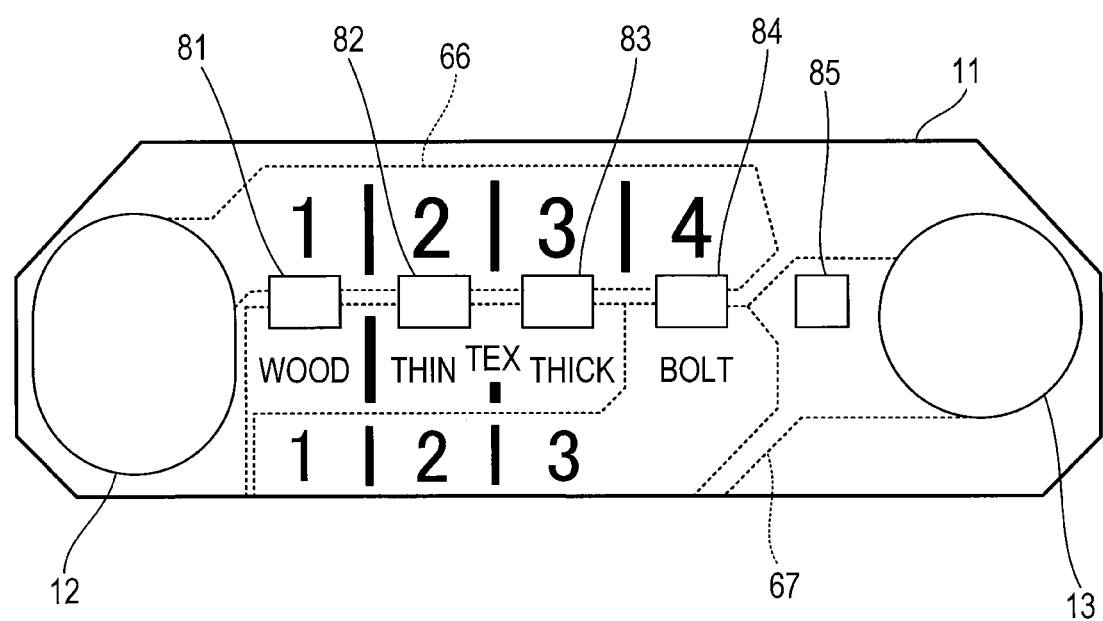
FIG. 4 is a plan view of an operation panel.

As shown in FIG. 4, the operation panel 11 includes the impact button 12, the special button 13, an impact mode indicator 66, a special mode indicator 67, in addition to the first to the fifth LEDs 81 to 85.

The impact mode indicator 66 and the special mode indicator 67 turn on or off each of the first to fifth LEDs 81 to 85 based on a command from the indicator circuit 54.

When the driver 1 is set to the Max mode, the first to fourth LEDs 81 to 84 are turned on. When the driver 1 is set to the Hard mode, the first to third LEDs 81 to 83 are turned on. When the driver 1 is set to the Medium mode, the first and second LEDs 81 and 82 are turned on. When the driver 1 is set to the Soft mode, the first LED 81 is turned on.

When the driver 1 is set to the Wood mode, the first and fifth LEDs 81 and 85 are turned on. When the driver 1 is set to the First Tex mode, the second and fifth LEDs 82 and 85 are turned on. When the operation mode is set to the Second Tex mode, the third and fifth LEDs 83 and 85 are turned on.

When the driver 1 is set to the First Bolt mode, the first, fourth, and fifth LEDs 81, 84 and 85 are turned on. When the driver 1 is set to the Second Bolt mode, the second, fourth, and fifth LEDs 82, 84, and 85 are turned on. When the driver 1 is set to the Third Bolt mode, the third, fourth, and fifth LEDs 83, 84, and 85 are turned on.

Each of the four impact modes (Max mode, Hard mode, Medium mode, and Soft mode) has a first set of basic duty ratios and a second set of basic duty ratios. Each of the first set of basic duty ratios and the second set of basic duty ratios is assigned to a base for a duty ratio (drive duty ratio) of the PWM signals.

In the present embodiment, the trigger pulling amount varies from "1" (first level) to "10" (tenth level). The first level corresponds to a range including a minimum trigger pulling amount. The tenth level corresponds to a range including a maximum trigger pulling amount. The level sequentially increases from the first level to the tenth level in response to the trigger pulling amount increasing.

As later described with reference to FIG. 5, ten levels are associated with the respective basic duty ratios included in the first and second sets of basic duty ratios. In each of the four impact modes, a basic duty ratio corresponding to the tenth level is the largest of the first set of basic duty ratios, and a basic duty ratio corresponding to the tenth level is the largest of the second set of basic duty ratios. When the motor 21 is driven based on the basic duty ratio corresponding to the tenth level, the motor 21 rotates at a maximum speed.

The basic duty ratio associated with the tenth level of the first set of basic duty ratios in each of the four impact modes decrease in an order of the Max mode, the Hard mode, the Medium mode, and the Soft mode. The basic duty ratio associated with the tenth level of the second set of basic duty ratios in each of the four impact modes decrease in an order of the Max mode, the Hard mode, the Medium mode, and the Soft mode.

In any of the four impact modes, the first and second basic duty ratios corresponding to the first level are minimum values near zero (0). In any of the four impact modes, as the trigger pulling amount increases from the first level to the tenth level, the corresponding basic duty ratios gradually increase.

Accordingly, in the four impact modes, the trigger pulling amount of the first level or more is an effective operation range, and the trigger pulling amount from the first level to the tenth level is a control range. The effective operation range corresponds to a range of the trigger pulling amount where the motor 21 is drivable. The control range corresponds to a range where the motor speed is adjustable.

Therefore, when the trigger 7 is pulled in any of the four impact modes, the motor speed gradually increases. In this case, the motor speed in a no-load state reaches a constant speed that corresponds to the trigger pulling amount.

Then, when a load is applied to the motor 21 due to tightening of a screw or the like, the motor speed decreases in accordance with the load. When hammering occurs after the motor speed decreases in accordance with the load, the load applied to the motor 21 temporarily decreases. Thus, the motor speed fluctuates.

The effective operation range and the control range may be set appropriately with an entire operation area of the trigger 7.

The First Tex mode and the Second Tex mode are settings for tightening a Tex screw. The Tex screw has a leading end with a drill blade. The Tex screw is tightened to a workpiece while opening a screw-hole in the workpiece with the drill blade.

In the Second Tex mode, the control circuit 56 drives the motor 21 by the PWM signals based on the basic duty ratio corresponding to the trigger pulling amount in a first driving term, as in a case of the four impact modes. The first driving term is a time period from when the motor 21 is started until a first impact is detected. The first set of basic duty ratios in the Second Tex mode are consistent with the first set of basic duty ratios in the Max mode. The second set of basic duty ratios in the Second Tex mode are consistent with the second set of basic duty ratios in the Max mode.

In the Second Tex mode, when a specified number of impacts occur, the control circuit 56 determines that a screw-hole is formed in the workpiece. In this case, the control circuit 56 reduces the duty ratio of the PWM signals to decrease the motor speed.

This allows the motor 21 to rotate at a high speed from when the motor 21 is started until a screw-hole is formed in the workpiece. The motor 21, after a screw-hole is formed in the workpiece, can reduce the motor speed. Therefore, the user can stably perform screw tightening.

Either of the First Tex mode or the Second Tex mode may be selectively used depending on a thickness of the workpiece.

In the First Tex mode, the control circuit 56 drives the motor 1 by the PWM signals based on the first or second basic duty ratio corresponding to the trigger pulling amount in the first driving term, as in the case of the four impact modes. However, in the First Tex mode, the basic duty ratio corresponding to the trigger pulling amount from among the first set of basic duty ratios is slightly smaller than the basic duty ratio corresponding to the same trigger pulling amount from among the first set of basic duty ratios in the Hard mode. The basic duty ratio corresponding to the trigger pulling amount from among the second set of basic duty ratios is also slightly smaller than the basic duty ratio corresponding to the same trigger pulling amount from among the second set of basic duty ratios in the Hard mode. In other words, the motor speed in the First Tex mode is slightly smaller than the motor speed in the Hard mode.

When the specified number of impacts occur, the control circuit 56 stops the motor 21.

In the Wood mode, when the trigger 7 is pulled, the control circuit 56 sets the first or second basic duty ratio in accordance with the trigger pulling amount. The basic duty ratio corresponding to the trigger pulling amount from among the first set of basic duty ratios in the Wood mode is smaller than the basic duty ratio corresponding to the same trigger pulling amount from among the first set of basic duty ratios in the Max mode. The basic duty ratio corresponding to the trigger pulling amount from among the second set of basic duty ratios in the Wood mode is also smaller than the basic duty ratio corresponding to the same trigger pulling amount from among the second set of basic duty ratios in the Max mode.

Then, when the specified number of impacts occur after the motor 21 is started, the control circuit 56 gradually increases the drive duty ratio. This is because, when a screw is fastened to the wood, the screw may not be cut into the wood immediately after the motor 21 is driven. When the screw is not cut into the wood, it is necessary to slowly rotate the screw, immediately after the motor 21 is driven, to have the screw cut into the wood.

In the Wood mode, the control circuit 56, after the motor 21 is started, drives the motor 21 at a low rotational speed. The control circuit 56, when the specified number of impacts occur after the motor 21 is driven at a low rotational speed, gradually increases the motor speed, assuming that the screw is cut into the wood. As a result, the user can efficiently tighten the screw to the wood in a short time.

The First Bolt mode, the Second Bolt mode, and the Third Bolt mode are settings for tightening or loosening a bolt or a nut. Hereinafter, the First Bolt mode, the Second Bolt mode, and the Third Bolt mode are collectively called Bolt mode.

When rotating the motor 21 to tighten or loosen a bolt, a tool bit is fitted over a head of the bolt. Thus, it is unlikely that the tool bit slips off from the bolt.

Therefore, in the Bolt mode, the trigger pulling amount corresponding to the maximum basic duty ratio is smaller than the trigger pulling amount corresponding to the maximum basic duty ratio in the four impact modes.

In other words, in the Bolt mode, the basic duty ratio is largest when the trigger pulling amount is the fourth level or more.

Also, in the Bolt mode, the basic duty ratio corresponding to each of the trigger pulling amounts of the fourth level or more from among the first set of basic duty ratios is set to the same or almost the same value as the largest value of the first set of basic duty ratios in the Max mode (that is, basic duty ratio corresponding to the tenth level). The reason is that a bolt can be quickly tightened or loosened. The same applies to the basic duty ratio corresponding to each of the trigger pulling amounts of the fourth level or more from among the second set of basic duty ratios in the Bolt mode.

Therefore, in the Bolt mode, the motor 21 rotates at the fastest speed even if the trigger 7 is pulled a little, as compared to a case in the Max mode. This allows the user to efficiently tighten or loosen a bolt in a short time.

Also, the user, in the Bolt mode, can rotate the motor 21 at a high speed without pulling the trigger 7 to near the maximum trigger pulling amount. Thus, finger fatigue of the user due to operation of the trigger 7 upon tightening or loosening a bolt is reduced. This can inhibit a situation where the user cannot continue the operation for a long time.

Also, in the Bolt mode, the motor 21 is reversely rotated to loosen a bolt or nut. In this case, when the motor 21 is started, the impact occurs right away due to a load applied from the bolt or the nut.

Then, when the bolt or nut is loosened by the impact, the load applied to the motor 21 is reduced. This increases the motor speed.

Therefore, the control characteristics corresponding to the Bolt mode are set as follows. At the time of reverse rotation of the motor 21, when the impact is no longer detected for a specified time period after detection of the impact, the motor 21 is stopped or the motor speed is reduced.

Thus, when loosening a bolt or a nut, the motor 21 is inhibited from rotating more than necessary. This inhibits a bolt or a nut from falling off from the tool bit.

In the First Bolt mode, the control circuit 56 rotates the motor 21 in the forward direction as follows. The control circuit 56 drives the motor 21 at the motor speed of 2500 rpm (revolution per minute) from when the motor 21 is started until the impact occurs. Then, when the specified number of impacts occur, the control circuit 56 stops the motor 21.

In the First Bolt mode, the control circuit 56 rotates the motor 21 in the reverse direction. The control circuit 56 first drives the motor 21 at 2500 rpm. Then, after the impact is detected and when the impact is no longer detected for a specified time period, the control circuit 56 rotates the motor 21 twice and stops the motor 21.

In the Second Bolt mode, the control circuit 56 rotates the motor 21 in the forward direction as follows. The control circuit 56 drives the motor 21 as in the Max mode from when the motor 21 is started until the impact occurs. Then, when the specified number of impacts occur and then the impact further continues for 0.3 seconds, the control circuit 56 stops the motor 21.

In the Second Bolt mode, the control circuit 56 rotates the motor 21 in the reverse direction as follows. The control circuit 56 first drives the motor 21 as in the Max mode. Then, after the impact is detected and when the impact is no longer detected for a specified time, the control circuit 56 rotates the motor 21 twice and then stops the motor 21.

In the Third Bolt mode, the control circuit 56 rotates the motor 21 in the forward direction as follows. The control circuit 56 drives the motor 21 as in the Max mode from when the motor 21 is started until the impact occurs. Then, when the specified number of impacts occur and then the impact further continues for one second, the control circuit 56 stops the motor 21.

In the Third Bolt mode, the control circuit 56 rotates the motor 21 in the reverse rotation as follows. The control circuit 56 first drives the motor 21 as in the Max mode. Then, after the impact is detected and when the impact is no longer detected for a specified time period, the control circuit 56 rapidly reduces the motor speed to 250 rpm.

In the ROM 56b, a setting table 90 shown in FIG. 5 is stored. The setting table 90 includes a set of levels of the trigger pulling amount. The setting table 90 further includes a first set of target rotational speeds, a second set of target rotational speeds, a first set of basic duty ratios, and a second set of basic duty ratios, associated with each of the four impact modes.

The first set of target rotational speeds, the first set of basic duty ratios, the second set of target rotational speeds, and the second set of basic duty ratios are associated with the ten levels (first to tenth levels) of the trigger pulling amount. In other words, in the present embodiment, the first set of target rotational speeds include, for example, ten target rotational speeds. The first set of basic duty ratios include, for example, ten basic duty ratios. The second set of target rotational speeds, for example, includes ten target rotational speeds. The second set of basic duty ratios include, for example, ten basic duty ratios.

The first set of target rotational speeds and the first set of basic duty ratios are, for example, referred in the first driving term. The second set of target rotational speeds and the second set of basic duty ratios are, for example, referred in a second driving term. The second driving term is, for example, a specified time period after initial impact timing (for example, until the motor 21 is stopped). The initial impact timing corresponds to a timing when the impact is first detected after the motor 21 is started.

Any two of the first to tenth levels correspond to an example of a first level and a second level of the present disclosure.

Although not shown in FIG. 5, the setting table 90 also includes the first set of target rotational speeds, the first set of basic duty ratios, the second set of target rotational speeds, and the second set of basic duty ratios for each of the Wood mode, the First Tex mode, the Second Tex mode, the First Bolt mode, the Second Bolt mode, and the Third Bolt mode, as in the four impact modes.

Figure 6:
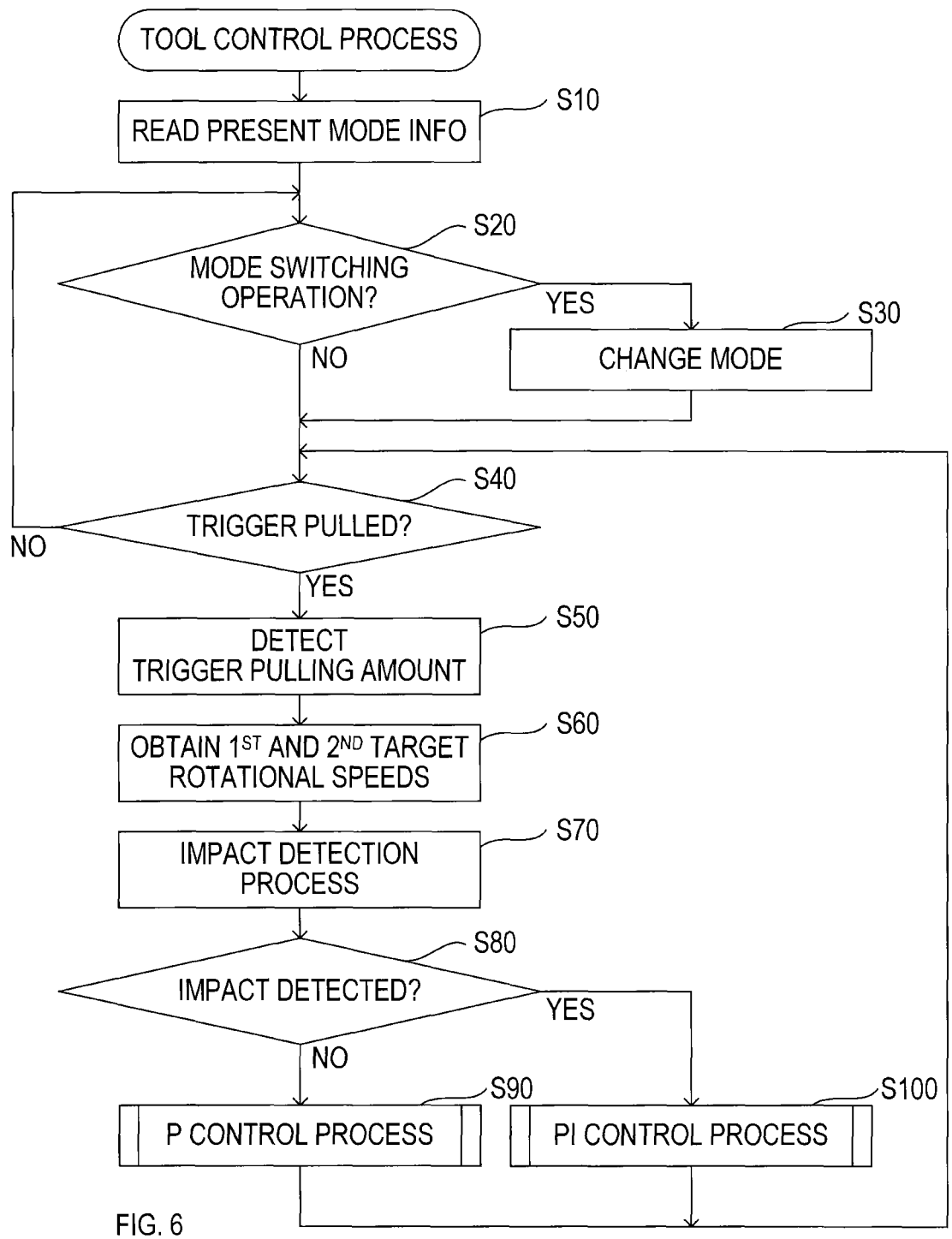
FIG. 6 is flowchart showing a tool control process of a first embodiment.

Hereinafter, a tool control process executed by the CPU 56a will be described with reference to FIG. 6. The tool control process is started when the control circuit 56 receives the power-supply voltage Vcc and is started.

The CPU 56a when starting the tool control process, reads present mode information from the ROM 56b in S10. The present mode information indicates the operation mode presently set.

The CPU 56a determines in S20 whether a mode switching operation is performed. The mode switching operation corresponds to operation of the mode-changing switch 9, the impact button 12, or the special button 13.

When the mode switching operation is not performed, the CPU 56a proceeds to S40. When the mode switching operation is performed (for example, when the mode-changing switch 9 is operated), the CPU 56a proceeds to S30. In S30, the CPU 56a changes the operation mode based on the presently set operation mode and the mode switching operation detected in S20. In S30, information indicating the operation mode after the change is stored as present mode information in the ROM 56b. After the process in S30, the CPU 56a proceeds to S40.

In S40, the CPU 56a determines whether the trigger 7 is pulled based on an input signal from the main switch 61. When the trigger 7 is not pulled, the CPU 56a proceeds to S20.

When the trigger 7 is pulled, the CPU 56a detects the trigger pulling amount based on the input signal from the operated amount sensor 62 in S50. The CPU 56a obtains the first target rotational speed from the setting table 90 in S60. The first target rotational speed corresponds to the present operation mode and the trigger pulling amount. Specifically, the CPU 56a determines an actual level (any of first to tenth level) of the trigger pulling amount. The actual level corresponds to the detected trigger pulling amount. The CPU 56a obtains the target rotational speed corresponding to the actual level from among the first set of target rotational speeds as the first target rotational speed. The first set of target rotational speeds correspond to the present operation mode. In S60, the CPU 56a further obtains the second target rotational speed from the setting table 90 in the same manner as for the first target rotational speed. The second target rotational speed corresponds to the present operation mode and the trigger pulling amount (specifically, the actual level).

In S70, the CPU 56a executes an impact detection process. The impact detection process is a process to detect whether the impact has occurred. The impact detection process may be executed as follows, for example. The CPU 56a first determines whether variation in the motor speed is equal to or greater than a preset first threshold. The variation in the motor speed may be, for example, calculated by the speed calculator 74 within a preset determination time. In the present embodiment, the determination time is set to 50 [ms], for example, and the first threshold is set to 100 rpm, for example.

When the variation in the motor speed is smaller than the first threshold, the CPU 56a terminates the impact detection process.

On the other hand, if the variation in the motor speed is equal to or greater than the first threshold, the CPU 56a increments a value of an impact counter provided in the RAM 56c (for example, by one). When the trigger 7 is released, the value of the impact counter is reset (for example, set to zero (0)).

The CPU 56a further determines whether the value of the impact counter is equal to or greater than a preset impact determination count. When the value of the impact counter is smaller than the impact determination count, the CPU 56a terminates the impact detection process.

When the value of the impact counter is equal to or greater than the impact determination count, the CPU 56a sets a impact detection flag provided in the RAM 56c. When setting the impact detection flag, the CPU 56a terminates the impact detection process. The impact detection flag may be cleared at any timing. The impact detection flag may be cleared, for example, when the trigger 7 is released.

When the impact detection process in S70 is terminated, the CPU 56a determines in S80 whether the impact is detected. Specifically, the CPU 56a determines whether the impact detection flag is set. The CPU 56a, when the impact detection flag is set, determines that the impact is detected. The CPU 56a, when the impact detection flag is cleared, determines that the impact is not detected.

When it is determined in S80 that the impact is not detected, the CPU 56a executes a proportional (P) control process in S90. After the P control process is executed, the CPU 56a proceeds to S40. On the other hand, when it is determined in S80 that the impact is detected, the CPU 56a executes a proportional-integral (PI) control process in S100. After the PI control process is executed, the CPU 56a proceeds to S40.

Figure 7:
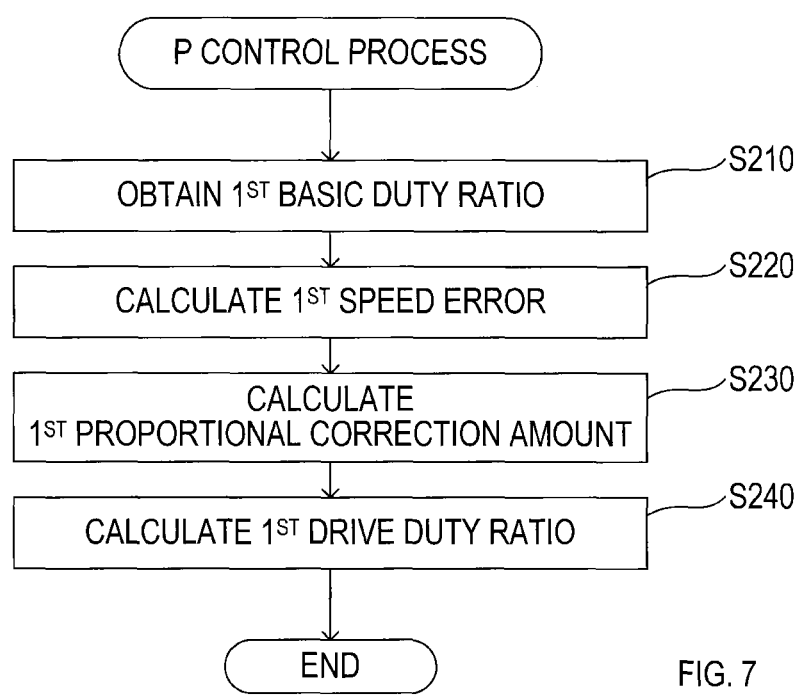
FIG. 7 is a flowchart showing a P control process of the first embodiment.

The P control process in S90 will be specifically described with reference to FIG. 7.

The CPU 56a, when starting the P control process, obtains a first basic duty ratio BD1 from the setting table 90 in S210. Specifically, the CPU 56a obtains the basic duty ratio corresponding to the trigger pulling amount detected in S50 (specifically, corresponding to the actual level) from among the first set of basic duty ratios corresponding to the present operation mode, as the first basic duty ratio BD1. The CPU 56a stores a value indicating the obtained first basic duty ratio BD1 in a first memory area. The first memory area may be provided, for example, in the RAM 56c.

The CPU 56a calculates a first speed error Dif1 in S220. The first speed error Dif1 is a difference between the first target rotational speed obtained in S60 and the present motor speed (actual rotational speed) calculated by the speed calculator 74. The CPU 56a stores the calculated first speed error Dif1 in a second memory area. The second memory area may be provided, for example, in the RAM 56c.

The CPU 56a calculates a first proportional correction amount (or a first proportional duty ratio) OP1 in S230. The first proportional correction amount OP1 is a value obtained by multiplying the first speed error Dif1 stored in the second memory area and a preset proportional gain GP. The CPU 56a stores the calculated first proportional correction amount OP1 in a third memory area. The third memory area may be provided, for example, in the RAM 56c. In the present embodiment, the proportional gain GP may be set to, for example, 0.01.

The CPU 56a calculates a first drive duty ratio DD1 in S240 and terminates the P control process. The first drive duty ratio DD1 is a sum of the first basic duty ratio BD1 stored in the first memory area and the first proportional correction amount OP1 stored in the third memory area. The CPU 56a stores the calculated first drive duty ratio DD1 in a fourth memory area. The fourth memory area may be provided, for example, in the RAM 56c. The CPU 56a generates the PWM signals based on the first drive duty ratio DD1. The motor drive control device 76 drives the drive circuit 51 (and the motor 21) in accordance with the PWM signals.

Figure 8:
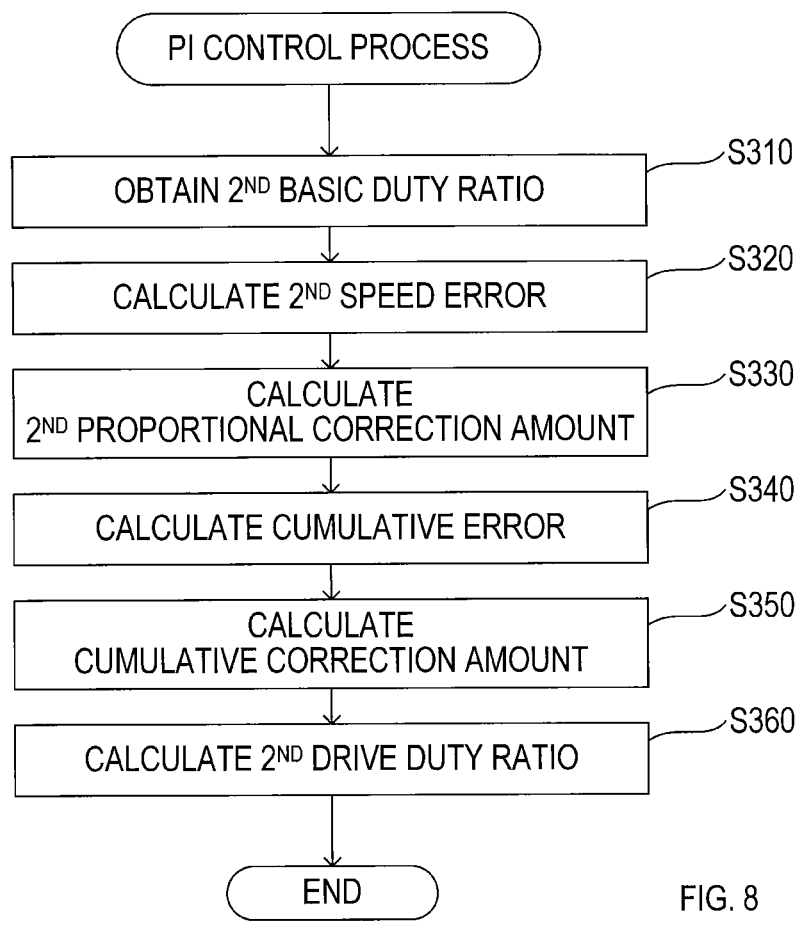
FIG. 8 is a flowchart showing a PI control process.

The PI control process in S100 will be described with reference to FIG. 8.

The CPU 56a, when starting the PI control process, obtains a second basic duty ratio BD2 from the setting table 90 in S310. Specifically, the CPU 56a obtains the basic duty ratio corresponding to the trigger pulling amount detected in S50 (specifically, corresponding to the actual level) from among the second set of basic duty ratios corresponding to the present operation mode, as the second basic duty ratio BD2. The CPU 56a stores a value indicating the obtained second basic duty ratio BD2, for example, in the first memory area.

The CPU 56a calculates a second speed error Dif2 in S320. The second speed error Dif2 is a difference between the second target rotational speed obtained in S60 and the actual speed. The CPU 56a stores the calculated second speed error Dif2, for example, in the second memory area.

The CPU 56a calculates a second proportional correction amount (or a second proportional duty ratio) OP2 in S330. The second proportional correction amount OP2 is a value obtained by multiplying the second speed error Dif2 stored in the second memory area and the proportional gain GP. The CPU 56a stores the calculated second proportional correction amount OP2, for example, in the third memory area. The proportional gain GP used in S330 may be the same as or different from the proportional gain GP used in S230.

The CPU 56a calculate a cumulative error DI in S340. The cumulative error DI is a value obtained by adding the second speed error Dif2 stored in the second memory area to the present cumulative error DI stored in the fifth memory area. In other words, the cumulative error DI corresponds to a value obtained by cumulatively adding the calculated second speed error Dif2 each time the second speed error Dif2 is calculated in S320 after the tool control process is started. The CPU 56a stores the calculated cumulative error DI in a fifth memory area. Specifically, the CPU 56a updates previous value of the cumulative error DI stored in the fifth memory area to the newest value of the cumulative error DI calculated this time. The fifth memory area may be provided, for example, in the RAM 56c.

The CPU 56a calculates a cumulative correction amount OI in S350. The cumulative correction amount OI is a value obtained by multiplying the cumulative error DI stored in the fifth memory area and a preset cumulative gain GI. The CPU 56a stores the calculated cumulative correction amount OI in a sixth memory area. The sixth memory area may be provided, for example, in the RAM 56c.

The CPU 56a calculates a second drive duty ratio DD2 in S360 and terminates the PI control process. The second drive duty ratio DD2 is a sum of the second basic duty ratio BD2 stored in the first memory area, the second proportional correction amount OP2 stored in the third memory area, and the cumulative correction amount OI stored in the sixth memory area. The CPU 56a stores the calculated second drive duty ratio DD2, for example, in the fourth memory area. The CPU 56a generates the PWM signals based on the second drive duty ratio DD2. The motor drive control device 76 drives the drive circuit 51 (and the motor 21) in accordance with the PWM signals.

Figure 9:
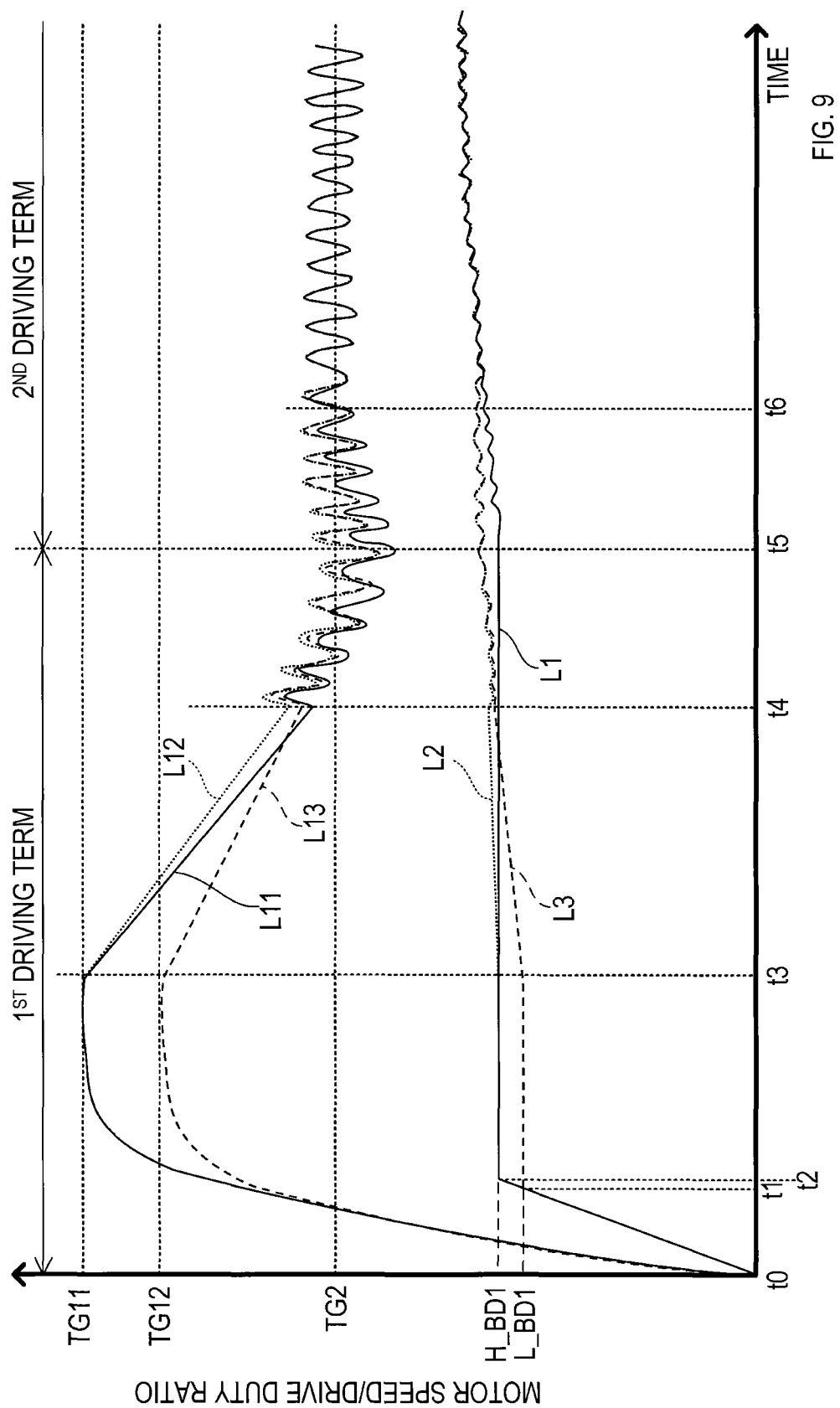
FIG. 9 is a graph showing a time change of a rotational speed of a motor and a duty ratio.

FIG. 9 is a graph showing varying in the motor speed and the drive duty ratio from when the motor 21 is started until a certain time period elapses. FIG. 9 includes the first driving term and the second driving term.

In FIG. 9, the motor 21 is started at time t0. The motor 21 is started to receive a load at time t3. The impacting is started at time t4. The impact is detected by the control circuit 56 (i.e., timing when the impact detection flag is set) at time t5.

In FIG. 9, there are a first waveform L1, a second waveform L2, and a third waveform L3 each indicating respective drive duty ratios. The drive duty ratio indicated by the first waveform L1 (hereinafter, "first duty ratio") corresponds to a high level first basic duty ratio H_BD1 in the first driving term. In other words, the first waveform L1 indicates that the P control process is not executed in the first driving term, and the PWM driving of (PWM control) of the drive circuit 51 is executed in accordance with the high level first basic duty ratio H_BD1. The first waveform L1 in the second driving term indicates the second drive duty ratio DD2 used in the PI control process. In other words, the first waveform L1 in the second driving term indicates that the PI control process in S100 is executed in accordance with the second drive duty ratio DD2.

The drive duty ratio indicated by the second waveform L2 (hereinafter, "second duty ratio") indicates the first drive duty ratio DD1 used in the P control process in the first driving term. In other words, the second waveform L2 in the first driving term indicates that the P control process in S90 is executed in accordance with the first drive duty ratio DD1. The first drive duty ratio DD1 in this case is calculated using the high level first basic duty ratio H_BD1. The second waveform L2 indicates the second drive duty ratio DD2 used in the PI control process in the second driving term. In other words, the second waveform L2 in the second driving term indicates that the PI control process in S100 is executed in accordance with the second drive duty ratio DD2.

The drive duty ratio indicated by the third waveform L3 (hereinafter, "third duty ratio") indicates the first drive duty ratio DD1 used in the P control process in the first driving term. In other words, the third waveform L3 in the first driving term indicates that the P control process in S90 is executed in accordance with the first drive duty ratio DD1. The first drive duty ratio DD1 in this case is calculated using a low level first basic duty ratio L_BD1. The low level first basic duty ratio L_BD1 is smaller than the high level first basic duty ratio H_BD1. The third waveform L3 in the second driving term indicates the second drive duty ratio DD2 used in the PI control process. In other words, the third waveform L3 in the second driving term indicates that the PI control process in S100 is executed in accordance with the second drive duty ratio DD2.

The first duty ratio increases linearly up to the high level first basic duty ratio H_BD1 from time t0 to time t2. The first duty ratio is maintained at the high level first basic duty ratio H_BD1 from time t2 to time t5. The first duty ratio gradually increases while fluctuating after time t5.

The second duty ratio increases linearly up to the high level first basic duty ratio H_BD1 from time t0 to time t2. The second duty ratio is maintained at the high level first basic duty ratio H_BD1 from time t2 to time t3. The second duty ratio increases linearly from time t3 to time t4. The second duty ratio gradually increases while fluctuating after time t4.

The third duty ratio increases linearly up to the low level first basic duty ratio L_BD1 from time t0 to time t1. The third duty ratio is maintained at the low level basic duty ratio L_BD1 from time t1 to time t3. The third duty ratio increases linearly from time t3 to time t4, and gradually increases while fluctuating after time t4. A rate of increase from time t3 to time t4 in the third duty ratio is greater than a rate of increase from time t3 to time t4 in the second duty ratio.

A fourth waveform L11 indicates a motor speed when the PWM control is executed in accordance with the first duty ratio (hereinafter, "first motor speed").

A fifth waveform L12 indicates a motor speed when the PWM control is executed in accordance with the second duty ratio indicated by the second waveform L2 (hereinafter, "second motor speed").

A sixth waveform L13 indicates a motor speed when the PWM control is executed in accordance with the third duty ratio (hereinafter, "third motor speed").

The first motor speed reaches a high level first target rotational speed TG11 between time t0 and time t3. The first motor speed decreases linearly from time t3 to time t4. The first motor speed gradually decreases while fluctuating from time t4 to time t5. The first motor speed is slightly below the second target rotational speed TG2 at time t5. The first motor speed gradually increases while fluctuating from time t5 to time t6. The first motor speed reaches the second target rotational speed TG2 at time t6. The first motor speed is maintained near the second target rotational speed TG2 while fluctuating after time t6.

The second motor speed reaches the high level first target rotational speed TG11 between time t0 and time t3. The second motor speed decreases linearly from time t3 to time t4. A rate of decrease from time t3 to time t4 in the second motor speed is smaller than a rate of decrease from time t3 to time t4 in the first motor speed.

The second motor speed gradually decreases while fluctuating from time t4 to time t5. The second motor speed fluctuates near the second target rotational speed TG2 at time t5. The second motor speed is maintained near the second target rotational speed TG2 while fluctuating after time t5.

The third motor speed reaches a low level first target rotational speed TG12 between time t0 and time t3. The low level first target rotational speed TG12 is lower than the high level first target rotational speed TG11. The third motor speed decreases linearly from time t3 to time t4. A rate of decrease from time t3 to time t4 in the third motor speed is smaller than a rate of decrease from time t3 to time t4 in the second motor speed.

The third motor speed gradually decreases while fluctuating from time t4 to time t5. The third motor speed fluctuates near the second target rotational speed TG2 at time t5. The third motor speed is maintained near the second target rotational speed TG2 while fluctuating after time t5.

The first and the second motor speeds, and the third motor speed are based on basic duty ratios distinct from each other. Therefore, actually, the timings when the impact is started (that is, time t4) are different between the first and the second motor speeds and the third motor speed. However, in FIG. 9, the timings when the impact is started are consistent. One of the reasons is to make it easy to compare the first and the second duty ratios and the third duty ratio. Another reason is to make it easy to compare the first and the second motor speeds and the third motor speed.

In the driver 1 of the above-described first embodiment, the control circuit 56 performs the PWM driving of the motor 1. More specifically, the control circuit 56 executes the P control process in the first driving term. The P control process is executed in accordance with the first drive duty ratio DD1. The P control process does not include an integration control process (or an integral action). In other words, the first drive duty ratio DD1 is a value that does not include a correction amount based on a cumulative value (integral value) of the first speed error Dif1. Specifically, the first drive duty ratio DD1 is obtained by adding the first proportional correction amount OP1 to the first basic duty ratio BD1. The first proportional correction amount OP1 is proportional to the first speed error Dif1. The first basic duty ratio BD1 is set in accordance with the first target rotational speed. The first drive duty ratio DD1 may be a value obtained, for example by adding only the first proportional correction amount OP1 to the first basic duty ratio BD1

The control circuit 56 executes the PI control process in the second driving term. In the PI control process, the control circuit 56 controls energizing the motor 21 so that the motor speed is consistent with the second target rotational speed. The second target rotational speed is set separately from the first target rotational speed.

This can inhibit the motor speed from decreasing before the impact is detected. Further, a difference between the second target rotational speed and the motor speed when the impact is detected can be reduced. Therefore, fluctuation of the motor speed when transitioning from the first driving term to the second driving term is inhibited, and usability of the driver 1 can be improved.

Further, after the impact is detected, the PI control process is executed. Therefore, it is inhibited that speed varying such that, for example, the motor speed decreases before the impact is detected and the motor speed increases after the impact is detected. This can improve usability of the driver 1.

In the above-described first embodiment, the driver 1 corresponds to an example of the electric power tool of the present disclosure. A step of S70 corresponds to an example of the impact detector of the present disclosure. The trigger 7 corresponds to an example of the manual operation receiver of the present disclosure. The ROM 56b corresponds to an example of the first memory and the second memory of the present disclosure.

The P control process executed in the first driving term corresponds to an example of the first motor control of the present disclosure. The first proportional correction amount OP1 corresponds to an example of the proportional duty ratio of the present disclosure. The first drive duty ratio corresponds to an example of the drive duty ratio of the present disclosure. The PI control process executed in the second driving term corresponds to an example of the second motor control of the present disclosure.

Second Embodiment

In the second embodiment, differences from the first embodiment will be explained. The same reference numerals as those in the first embodiment are given to the components common to those of the first embodiment.

The driver 1 of the second embodiment is different from that of the first embodiment in details of the P control process.

Figure 10:
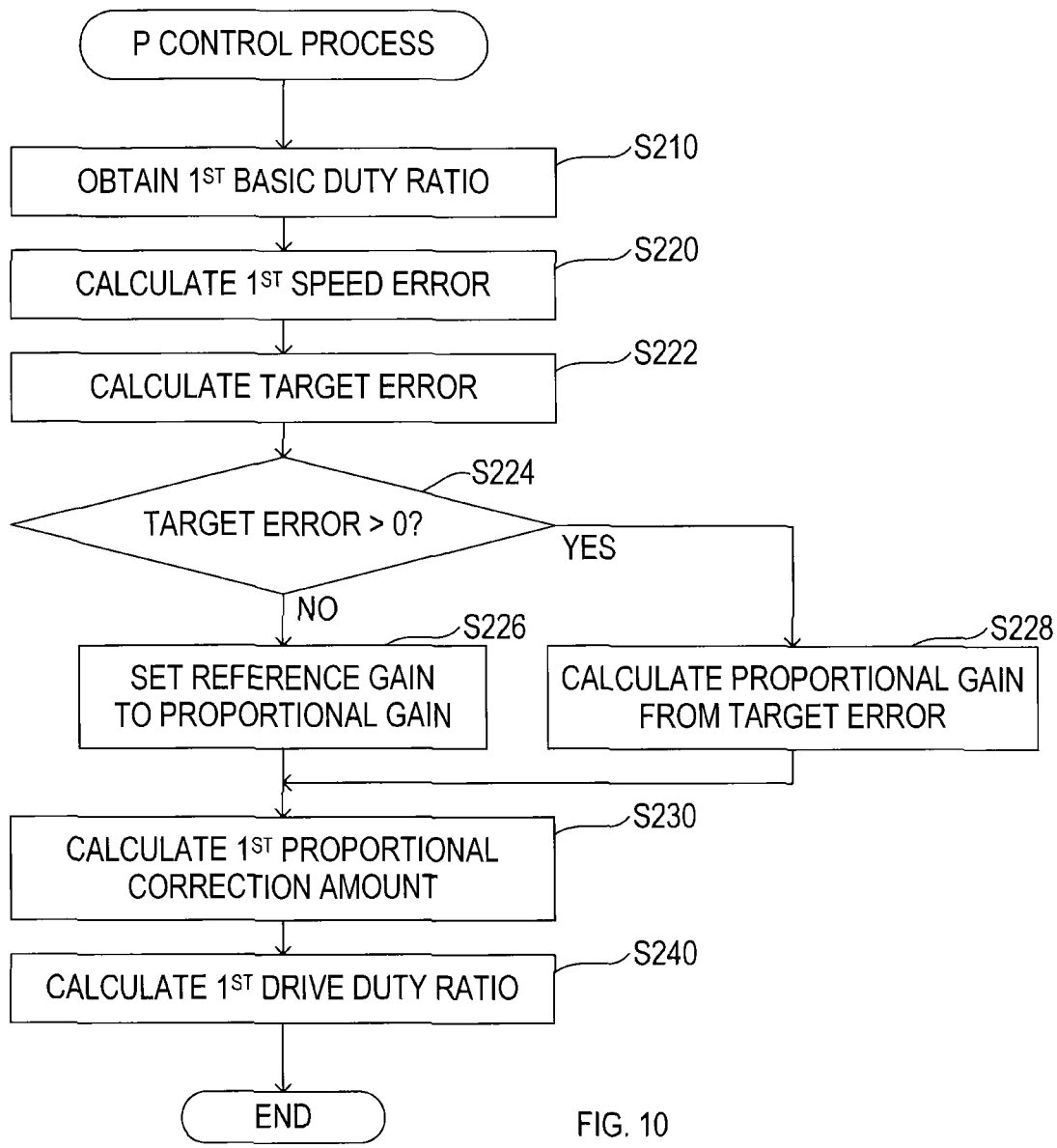
FIG. 10 is a flowchart showing the P control process of a second embodiment.

As shown in FIG. 10, the P control process of the second embodiment includes additional steps of S222, S224, S226, and S228.

When the step of S220 is completed, the CPU 56a calculates a target error TD in S222. The target error TD, for example, corresponds to a value obtained by subtracting the second target rotational speed obtained in S60 from the first target rotational speed obtained in S60. The CPU 56a stores a value indicating the calculated target error TD in a seventh memory area. The seventh memory area may be provided, for example, in the RAM 56c.

The CPU 56a determines in S224 whether the target error TD is greater than zero (0). Specifically, the CPU 56a determines whether the target error TD stored in the seventh memory area is greater than zero (0).

When the target error TD is equal to or smaller than zero (0), the CPU 56a executes a step of S226 and proceeds to S230. In S226, the CPU 56a sets a reference gain BG as the proportional gain GP. Specifically, the CPU 56a stores the preset reference gain BP to a memory area of the proportional gain GP provided in the RAM 56c.

On the other hand, if the target error TD is greater than zero (0), then the CPU 56a executes a step of S228 and proceeds to S230. In S228, the CPU 56a calculates a proportional gain GP from the target error TD. Specifically, the CPU 56a sets a value obtained by dividing the reference gain BP by the target error TD as the proportional gain GP.

In the driver 1 configured as such, the control circuit 56 varies the first proportional correction amount OP1 in accordance with the difference between the first target rotational speed and the second target rotational speed. This allows the driver 1 to reduce the difference between the target rotational speed and the motor speed after the impact is detected, in accordance with the difference between the first target rotational speed and the second target rotational speed.

Also, the control circuit 56 varies the first proportional correction amount OP1 so that the first proportional correction amount OP1 increases in response to the difference decreasing. As a result, the smaller the difference is, the more the driver 1 can inhibit a decrease in the motor speed before the impact is detected (i.e., during the first driving term). Thus, the driver can reduce the difference between the second target rotational speed and the actual speed at the time of impact detection.

In the second embodiment, the step of S230 based on the proportional gain calculated in S228 corresponds to an example of the proportional duty ratio varying process of the present disclosure.

Third Embodiment

In the third embodiment, differences from the first embodiment will be explained. The same reference numerals as those in the first embodiment are given to the configurations common to those of the first embodiment.

The driver 1 of the third embodiment is different from that of the first embodiment in details of the tool control process.

Figure 11:
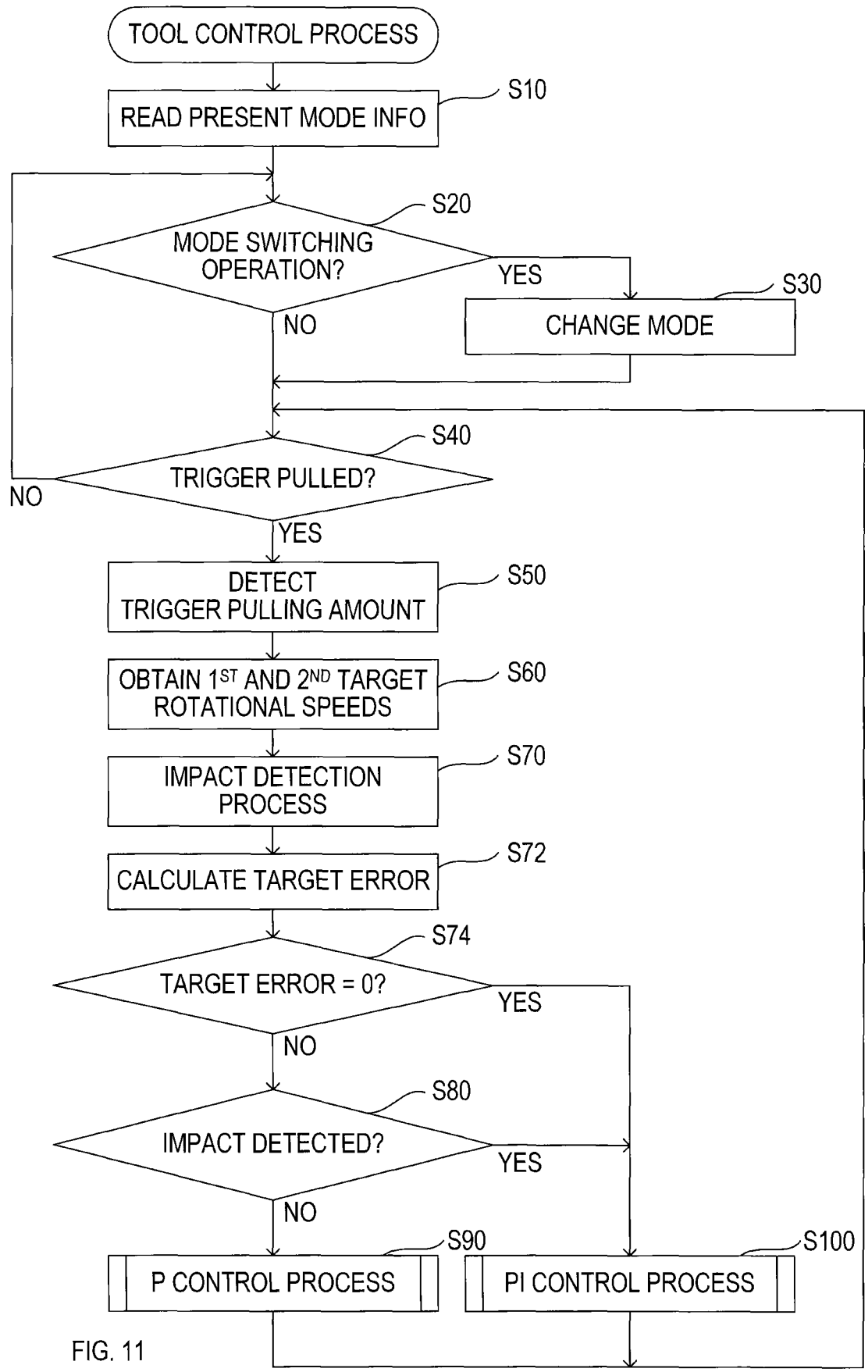
FIG. 11 is a flowchart showing the tool control process of a third embodiment.

As shown in FIG. 11, the tool control process of the third embodiment includes additional steps of S72 and S74.

In the tool control process of the third embodiment, when the step of S70 is completed, the CPU 56a calculates the target error TD in S72, as in S222.

The CPU 56a determines in S74 whether the target error TD is zero (0). Specifically, the CPU 56a determines whether the target error TD stored in the seventh memory area is zero (0).

When the target error TD is not zero (0), the CPU 56a proceeds to S80. If the target error TD is zero (0), then the CPU 56a proceeds to S100.

In the driver 1 configured as such, when the difference between the first target rotational speed and the second target rotational speed is zero (0), the control circuit 56 controls energizing the motor 21 so that the motor speed is constant before the impact is detected. Specifically, the PI control process is executed. In other words, the driver 1 does not switch the motor control methods before the impact detection and after the impact detection (i.e., during the second driving term), when the difference is zero (0). The driver 1 performs a constant rotation control (PI control process) both before and after the impact detection. This can improve usability of the driver 1.

In the above-described third embodiment, the PI control process executed before the impact detection (i.e., during the first driving term) corresponds to an example of the constant rotation control of the present disclosure.

Fourth Embodiment

In the fourth embodiment, differences from the first embodiment will be explained. The same reference numerals as those in the first embodiment are given to the configurations common to those of the first embodiment.

The driver 1 of the fourth embodiment is different from that of the first embodiment in that details of the tool control process.

Figure 12:
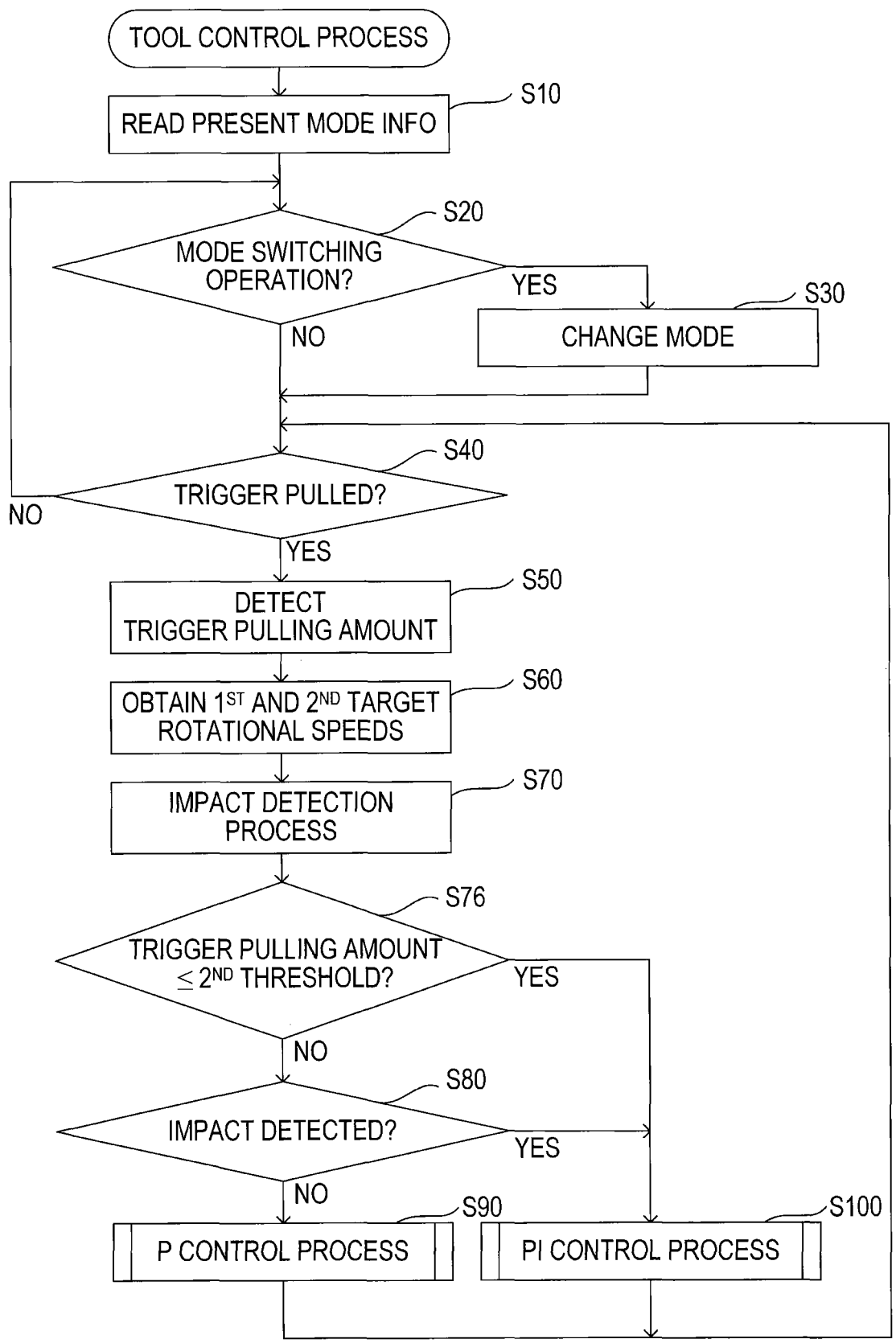
FIG. 12 is a flowchart showing the tool control process of a fourth embodiment.

As shown in FIG. 12, the tool control process of the fourth embodiment includes an additional step of S76.

In the tool control process of the fourth embodiment, when the step of S70 is completed, the CPU 56a determines in S76 whether the trigger pulling amount is equal to or smaller than a preset second threshold. The second threshold corresponds to an example of a threshold of the present disclosure.

When the trigger pulling amount exceeds the second threshold, the CPU 56a proceeds to S80. When the trigger pulling amount is equal to or smaller than the second threshold, the CPU 56a proceeds to S100.

In the driver 1 configured as such, when the trigger pulling amount is equal to or smaller than the second threshold, the control circuit 56 controls energizing the motor 21 so that the motor speed is maintained constant before the impact is detected. In other words, the control circuit 56 performs the PI control process also before the impact detection. In other words, the driver 1 does not switch the motor control methods before and after the impact detection when the trigger pulling amount is equal to or smaller than the second threshold. The driver 1 performs the constant rotation control (PI control process) both before and after the impact detection. This can improve usability of the driver 1.

In the above-described fourth embodiments, the trigger pulling amount corresponds to an example of a level of manual operation of the present disclosure. The PI control process executed when the trigger pulling amount is equal to or smaller than the second threshold in the first driving term corresponds to an example of the constant rotation control of the present disclosure.

Although the embodiment of the present disclosure has been described above, the present disclosure is not limited to the above-described embodiment, but may be practiced in various forms.

For example, in the aforementioned third and fourth embodiments, the constant rotation control (i.e., PI control) is performed both before and after the impact detection. In this case, the proportional gain GP (corresponding to an example of a first proportional gain of the present disclosure) used in the constant rotation control before the impact detection may be distinct from the proportional gain GP (corresponding to an example of a second proportional gain of the present disclosure) used in the constant rotation control after the impact detection. This allows the driver 1 to execute the PI control process appropriate to the respective situations before and after the impact detection.

Further the proportional gain GP before the impact detection may be greater than the proportional gain GP after the impact detection. This allows the driver 1 to easily maintain the constant motor speed before the impact is detected, and inhibit an increase in fluctuation amplitude of energizing the motor 21 after the impact is detected.

In the aforementioned embodiments, the first to fifth LEDs 81 to 85 are used for indication both in the impact mode and the special mode. Distinct LEDs may be used for the respective impact mode and special mode.

Two or more functions of one element in the aforementioned embodiment may be achieved by two or more elements; or one function of one element in the aforementioned embodiment may be achieved by two or more elements. Likewise, two or more functions of two or more elements may be achieved by one element; or one function achieved by two or more elements may be achieved by one element. A part of the configuration of the aforementioned embodiment may be omitted; and at least a part of the configuration of the aforementioned embodiment may be added to or replaced with another part of the configuration of the aforementioned embodiment.

In addition to the above-described driver 1, the present disclosure may be practiced in various modes such as a program enabling a computer to function as the control circuit 56, a non-transitory tangible storage medium, such as a semiconductor memory, storing the program, and a tool control method.

What is claimed is:

1. An electric power tool comprising:
a motor;
an impact mechanism including a hammer and an anvil, the hammer being configured to be rotated by the motor, the anvil being configured to rotate in response to receiving a rotational force of the hammer, the anvil being configured to be attached to a tool bit, the hammer being configured to impact the anvil in a rotation direction of the hammer in response to receipt of a first torque by the anvil, and the first torque being equal to or greater than a preset magnitude;
an impact detector configured to detect impact on the anvil performed by the hammer; and
a control circuit configured to control a motor current based on a pulse width modulation signal, the motor current being supplied to the motor to drive the motor, the control circuit being configured to execute a first motor control in a first driving term, the first driving term corresponding to a time period from when the motor is started by the control circuit until the impact is detected by the impact detector, the first motor control including controlling the motor current in accordance with the pulse width modulation signal based on an drive duty ratio, the drive duty ratio corresponding to a sum of a basic duty ratio and a proportional duty ratio, the basic duty ratio being set in accordance with a first target rotational speed of the motor, the proportional duty ratio being proportional to a speed error, the speed error corresponding to a difference between the first target rotational speed and an actual rotational speed of the motor, and the control circuit being configured to execute a second motor control in response to elapse of the first driving term, and the second motor control including controlling the motor current so that the actual rotational speed is consistent with a second target rotational speed of the motor.

2. The electric power tool according to claim 1 further comprising:
a manual operation receiver configured to receive a manual operation by a user of the electric power tool, wherein
the control circuit is configured to set the first target rotational speed in accordance with the manual operation received by the manual operation receiver.

3. The electric power tool according to claim 2 further comprising:
a first memory storing a first rotational speed and a second rotational speed, wherein
the control circuit is configured to set the first rotational speed to the first target rotational speed in response to the manual operation received by the manual operation receiver reaching a first level, and the control circuit is configured to set the second rotational speed to the first target rotational speed in response to the manual operation received by the manual operation receiver reaching a second level.

4. The electric power tool according to claim 3, wherein the control circuit is configured to set the basic duty ratio so that the basic duty ratio increases in response to the first target rotational speed increasing.

5. The electric power tool according to claim 1, further comprising
a manual operation receiver configured to receive a manual operation by a user of the electric power tool, wherein
the control circuit is configured to set the second target rotational speed in accordance with the manual operation received by the manual operation receiver.

6. The electric power tool according to claim 5 further comprising:
a second memory storing a third rotational speed and a fourth rotational speed, wherein
the control circuit is configured to set the third rotational speed to the second target rotational speed in response to the manual operation received by the manual operation receiver reaching a first level, and the control circuit is configured to set the fourth rotational speed to the second target rotational speed in response to the manual operation received by the manual operation receiver reaching a second level.

7. The electric power tool according to claim 1, wherein the second motor control includes a proportional-integral control.

8. The electric power tool according to claim 1, wherein
the control circuit is configured to execute a proportional duty ratio varying process, the proportional duty ratio varying process including varying the proportional duty ratio in accordance with a difference between the first target rotational speed and the second target rotational speed.

9. The electric power tool according to claim 8, wherein
the proportional duty ratio varying process including varying the proportional duty ratio so that the proportional duty ratio increases in response to the difference between the first target rotational speed and the second target rotational speed decreasing.

10. The electric power tool according to claim 9, wherein
the control circuit is configured to execute the proportional duty ratio varying process in response to the first target rotational speed being greater than the second target rotational speed.

11. The electric power tool according to claim 8, wherein
the control circuit is configured to selectively execute either the first motor control or a constant rotation control, the constant rotation control including controlling the motor current so that the actual rotational speed is maintained to be constant, and
the control circuit is configured to execute the constant rotation control in the first driving term in response to the first target rotational speed being consistent with the second target rotational speed.

12. The electric power tool according to claim 11, wherein
each of the constant rotation control and the second motor control includes a proportional-integral control,
the control circuit is configured to execute the proportional-integral control in the constant rotation control based on a first proportional gain, and the control circuit is configured to execute the proportional-integral control in the second motor control based on a second proportional gain, the second proportional gain being different from the first proportional gain.

13. The electric power tool according to claim 12, wherein
the first proportional gain is greater than the second proportional gain.

14. The electric power tool according to claim 8, further comprising
a manual operation receiver configured to receive a manual operation by a user of the electric power tool, wherein
the control circuit is configured to control the motor current so that the actual rotational speed is varied in accordance with a level of the manual operation received by the manual operation receiver,
the control circuit is configured to selectively execute either the first motor control or a constant rotation control, the constant rotation control including controlling the motor current so that the actual rotational speed is maintained to be constant corresponding to the level of the manual operation, and
the control circuit is configured to execute the constant rotation control in the first driving term in response to the level of the manual operation being equal to or smaller than a threshold, the threshold determining which of the first motor control and the constant rotation control the control circuit executes in the first driving term.

15. The electric power tool according to claim 14, wherein
each of the constant rotation control and the second motor control includes a proportional-integral control,
the control circuit is configured to execute the proportional-integral control in the constant rotation control based on a first proportional gain, and the control circuit is configured to execute the proportional-integral control in the second motor control based on a second proportional gain, the second proportional gain being different from the first proportional gain.

16. The electric power tool according to claim 15, wherein
the first proportional gain is greater than the second proportional gain.

* * * * *